(12) United States Patent
Huang et al.

(10) Patent No.: US 9,547,885 B2
(45) Date of Patent: Jan. 17, 2017

(54) IMAGE REPAIRING METHOD AND DEVICE

(71) Applicant: SHENZHEN INSTITUTES OF ADVANCED TECHNOLOGY CHINESE ACADEMY OF SCIENCES, Shenzhen (CN)

(72) Inventors: Hui Huang, Shenzhen (CN); Kangxue Yin, Shenzhen (CN); Minglun Gong, Shenzhen (CN); Baoquan Chen, Shenzhen (CN); Yunhai Wang, Shenzhen (CN)

(73) Assignee: Shenzhen Institutes of Advanced Technology Chinese Academy of Sciences, Guangdong (CN)

( * ) Notice: Subject to any disclaimer, the term of this patent is extended or adjusted under 35 U.S.C. 154(b) by 0 days.

(21) Appl. No.: 14/765,447

(22) PCT Filed: Sep. 13, 2013

(86) PCT No.: PCT/CN2013/083447
§ 371 (c)(1),
(2) Date: Aug. 3, 2015

(87) PCT Pub. No.: WO2014/169561
PCT Pub. Date: Oct. 23, 2014

(65) Prior Publication Data
US 2015/0363906 A1    Dec. 17, 2015

(30) Foreign Application Priority Data

Apr. 19, 2013    (CN) .......................... 2013 1 0138362

(51) Int. Cl.
*G06K 9/36*    (2006.01)
*G06T 3/00*    (2006.01)
*G06T 7/00*    (2006.01)

(52) U.S. Cl.
CPC ........... *G06T 3/0081* (2013.01); *G06T 7/0028* (2013.01); *G06T 2207/20021* (2013.01)

(58) Field of Classification Search
CPC . G06K 7/10722; G06K 9/6209; G06T 3/0028; G06T 3/0081; G06T 7/0028; G06T 7/0083; G06T 7/0089; G06T 2207/20016; G06T 2207/20021; G06T 2207/20116; H04N 19/105; H04N 19/129; H04N 19/13; H04N 19/139; H04N 19/157; H04N 19/176; H04N 19/18; H04N 19/436; H04N 19/152
See application file for complete search history.

(56) References Cited

U.S. PATENT DOCUMENTS

| | | | | |
|---|---|---|---|---|
| 7,840,074 B2 * | 11/2010 | Trifonov | .............. | G06K 9/6209 382/164 |
| 8,144,980 B2 * | 3/2012 | Trifonov | .............. | G06K 9/6209 382/164 |

(Continued)

FOREIGN PATENT DOCUMENTS

| | | |
|---|---|---|
| CN | 102324102 | 1/2012 |
| CN | 103218785 | 7/2013 |
| TW | 201113831 | 4/2011 |

OTHER PUBLICATIONS

International Search Report mailed on Jan. 16, 2014 for International Application No. PCT/CN2013/083447 and its English translation.

*Primary Examiner* — Jose Couso
(74) *Attorney, Agent, or Firm* — Ladas & Parry, LLP

(57) ABSTRACT

Provided are an image restoration method and device. The method comprises: processing image blocks, which are initially registered, to acquire connection curves among the image blocks; constructing an ambient field of images to be restored by means of the connection curve; by minimizing (Continued)

energy of the connection curve in the ambient field, registering the image blocks; and performing image filling on the registered image blocks to acquire a restored image. The device comprises: a processing unit used for processing the image blocks, which are initially registered, to acquire the connection curve among the image blocks; an ambient field construction unit used for constructing the ambient field of the image to be restored by means of the connection curve; a registering unit used for registering the image blocks by minimizing the energy of the connection curve in the ambient field; and a filling unit used for performing image filling on the registered image blocks to acquire the restored image. The present invention can be applied to restore any damaged image and improve the accuracy.

11 Claims, 19 Drawing Sheets

(56) References Cited

U.S. PATENT DOCUMENTS

| | | | | |
|---|---|---|---|---|
| 8,152,070 B2* | 4/2012 | Al-Hussein | ........ | G06K 7/10722 |
| | | | | 235/462.09 |
| 9,292,933 B2* | 3/2016 | Madabhushi | ......... | G06T 7/0083 |

* cited by examiner

IMAGE REPAIRING METHOD AND DEVICE

CROSS-REFERENCE TO RELATED APPLICATION(S)

This application is the U.S. National Stage of International Patent Application No. PCT/CN2013/083447 filed on Sep. 13, 2013, which claims priority to Chinese Patent Application No. 201310138362.2 filed on Apr. 19, 2013, the disclosures of which are hereby incorporated in their entireties by reference.

TECHNICAL FIELD

Present disclosure relates to image processing technology, particularly to an image restoration method and device.

BACKGROUND

Image restoration refers to restoring and reconstructing damaged images such that a viewer cannot find out that the images have been restored. Traditional methods for image restoration mainly consist of two types: diffusion-based restoration method in which the information is diffused from an undamaged area to an area to be restored by a diffusion mechanism and texture-synthesis-based method in which pixel blocks which are similar with boundary pixels of the damaged area are searched near the damaged area, and then the pixel blocks obtained by the searching are copied under certain structural constraints and the seams among the pixel blocks are filled.

All traditional methods for image restoration assume that there are dislocations among image blocks of the images to be restored, i.e., there are overlapping areas among image blocks. However, the case that there is no overlapping area between the image blocks often occurs during actual image restoration. Therefore, the two types of methods mentioned above will not be suitable for restoring of any of damaged images.

Therefore, another image restoration method is provided, in which extrapolation is performed on the image blocks without overlapping such that these image blocks are overlapped in the extrapolation area, and then the extrapolated image blocks are registered to achieve the restoration of the image without overlapping area.

However, the extrapolation performed on the image blocks is very inaccurate and the registering by means of the extrapolation area will further increase the error. Besides, such image restoration method can only be suitable for square image blocks. Therefore, although this method can achieve the restoration of the image without overlapping area, the use of this method is limited and the accuracy of the restoration of the image cannot be ensured.

SUMMARY

Therefore, in order to solve the problems that the traditional image restoration methods cannot be suitable for the restoration of any damaged image and the accuracy is low, it is necessary to provide an image restoration method which can be suitable for the restoration of any damaged image and increase the accuracy.

In addition, it is further necessary to provide an image restoration system which can be suitable for the restoration of any damaged image and increase the accuracy.

An image restoration method may comprise following steps:

processing image blocks which are initially registered to acquire connection curves between the image blocks;

constructing an ambient field of an image to be restored by means of the connection curves;

registering the image blocks by minimizing energy of the connection curves in the ambient field; and performing image filling on the image blocks which are registered to acquire a restored image.

In one of the embodiments, the step of processing image blocks which are initially registered to acquire connection curves between the image blocks may comprise:

acquiring the image blocks which are initially registered, wherein the image blocks are acquired from the image to be restored;

acquiring salient curves in the image blocks inwardly along edges of the image blocks which are initially registered; and acquiring interrelated salient curves according to the salient curves and acquiring the connection curves between the interrelated salient curves.

In one of the embodiments, the step of constructing an ambient field of an image to be restored by means of the connection curves may comprise:

extracting a first longest entire curve from entire curves of the image to be restored and assigning the first longest entire curve a direction;

finding a solution of a harmonic vector field using the entire curve which has already been assigned a direction as Dirichlet boundary condition;

extracting second longest entire curves for entire curves which have not been assigned directions one by one, and determining directions of the second longest entire curves according to harmonic vector field of entire curves which have already been assigned directions till each of the entire curves which have not been assigned directions is assigned a direction; and acquiring a direction of the ambient field by finding solution of harmonic vector field of all entire curves, and calculating a magnitude component of the ambient field according to number of interrelated salient curves and projections of salient curves.

In one of the embodiments, the step of registering the image blocks by minimizing energy of the connection curves in the ambient field may comprise:

acquiring a transformation corresponding to the image blocks by minimizing the energy of the connection curves in the ambient field, acquiring translation and rotation of the connection curves according to the transformation corresponding to the image blocks, and registering the image blocks according to the translation and rotation of the connection curves.

In one of the embodiments, the step of performing image filling on the image blocks which are registered to acquire a restored image may comprise:

performing structural filling on the image blocks which are registered by means of the connection curves; and performing texture synthesis on the image blocks which are structurally filled to acquire the restored image.

In one of the embodiments, the step of performing structural filling on the image blocks which are registered by means of the connection curves may comprise:

discretizing the connection curves to acquire ordered point sets;

extracting a first subset which includes all of points which are located in seams among the image blocks;

extracting a second subset which has minimum color difference with the first subset, wherein a length of the second subset is equal to a length of the first subset; and deforming a pixel band of the second subset and copying it to the first subset, and fusing pixels of the first subset with surrounding pixels.

An image restoration device may comprise:

a processing unit which is used for processing image blocks which are initially registered to acquire connection curves between the image blocks;

an ambient field construction unit which is used for constructing an ambient field of an image to be restored by means of the connection curves;

a registering unit which is used for registering the image blocks by minimizing energy of the connection curves in the ambient field; and a filling unit which is used for performing an image filling on the image blocks which are registered to acquire a restored image.

In one of the embodiments, the processing unit may comprise:

an image block acquisition unit which is used for acquiring image blocks which are initially registered, wherein the image blocks are acquired from the image to be restored;

a salient curve acquisition unit which is used for acquiring salient curves in the image blocks inwardly along edges of the image blocks which are initially registered; and a connection curve acquisition unit which is used for acquiring interrelated salient curves according to the salient curves and acquiring connection curves between the interrelated salient curves.

In one of the embodiments, the ambient field construction unit may comprise:

a first extraction unit which is used for extracting a first longest entire curve from entire curves of the image to be restored and assigning the first longest entire curve a direction;

a vector field solving unit which is used for finding a solution of a harmonic vector field using the entire curve which has already been assigned a direction as Dirichlet boundary condition;

a circulation unit which is used for extracting second longest entire curves for entire curves which have not been assigned directions one by one, and determining directions of the second longest entire curves according to harmonic vector field of entire curves which have already been assigned directions till each of the entire curves which have not been assigned directions is assigned a direction; and an ambient field formation unit which is used for acquiring a direction component of the ambient field by finding solution of harmonic vector field of all entire curves, and calculating a magnitude component of the ambient field according to number of interrelated salient curves and projections of salient curves.

In one of the embodiments, the registering unit is further used for acquiring a transformation corresponding to the image blocks by minimizing the energy of the connection curves in the ambient field, acquiring translation and rotation of the connection curves according to the transformation corresponding to the image blocks, and registering the image blocks according to the translation and rotation of the connection curves.

In one of the embodiments, the filling unit may comprise:

a structural filling unit which is used for performing structural filling on the image blocks which are registered by means of the connection curves; and a texture synthesis unit which is used for performing texture synthesis on the image blocks which are structurally filled to acquire the restored image.

In one of the embodiments, the structural filling unit may comprise:

a discretization unit which is used for discretizing the connection curves to acquire ordered point sets;

a first subset extraction unit which is used for extracting a first subset which includes all of points which are located in seams among the image blocks;

a second subset extraction unit which is used for extracting a second subset which has minimum color difference with the first subset, wherein a length of the second subset is equal to a length of the first subset; and a fusion unit which is used for deforming a pixel band of the second subset and copying it to the first subset, and fusing pixels of the first subset with surrounding pixels.

The aforementioned image restoration methods and devices may process the image blocks which are initially registered to acquire the connection curves between the image blocks, construct the ambient field of the image to be restored by the connection curves, register the image blocks by minimizing the energy of the connection curves in the ambient field, and perform image filling on the registered image blocks to acquire the restored image. Because the overlapping area between the image blocks may be not necessary for the registering of the image blocks and an accurate registering may be achieved based on the numerical optimization by way of minimizing the energy of the connection curves in the ambient field, the aforementioned image restoration methods and devices may be suitable for the restoration of any damaged image and the accuracy of the restoration may be increased.

BRIEF DESCRIPTION OF THE DRAWINGS

FIG. 3b is a schematic diagram showing the salient curves extracted in FIG. 3a;

FIG. 5b is a schematic diagram showing the calculation of the distance performed in FIG. 5a;

FIG. 8b is a schematic diagram showing the image blocks which are registered corresponding to FIG. 8a;

DETAILED DESCRIPTION

Figure 1:
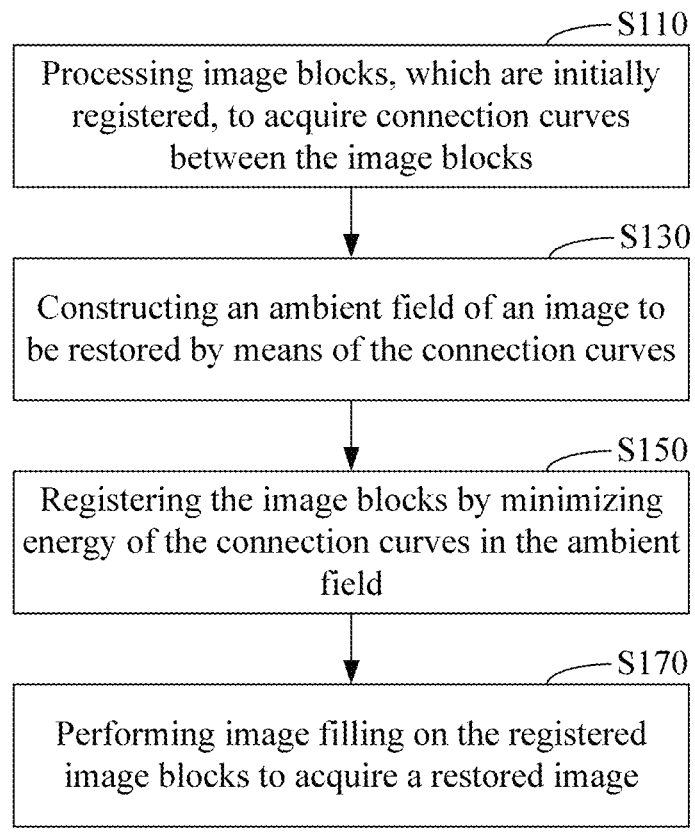
FIG. 1 is a flow chart of an image restoration method according to an embodiment.

As shown in FIG. 1, in one embodiment, an image restoration method may include following steps:

Step S110: processing image blocks which are initially registered to acquire connection curves between the image blocks.

In this embodiment, the image blocks which are initially registered may be acquired from image fragments of the image to be restored. These initially-registered image blocks form the image to be restored. Specifically, the initially-registered image blocks may be rough arrangement of the image blocks done by the user. The connection curves obtained by processing the initially-registered image blocks may be located in seams among the image blocks and used for associating image blocks which are in broken state with each other.

Step S130: constructing an ambient field of the image to be restored by means of the connection curves.

In this embodiment, the ambient field may include a magnitude component and a direction component and may be used for indicating magnitudes and directions of the energy of the curves in the image to be restored.

Step S150: registering the image blocks by minimizing the energy of the connection curves in the ambient field.

In this embodiment, the energy of the connection curve in the ambient field may be minimized using certain optimization algorithms, thereby it may be ensured based on this numerical optimization that the energy of the connection curve in the ambient field can be at least converged to local optimal result. The registering of the image blocks may be achieved by means of the minimized connection curve, thereby the registering of the image blocks will not be deviated and the accuracy of the registering of the image to be restored may be increased.

The optimization algorithms used for the registering of the image blocks may be steepest descent algorithm, Newton algorithm and BFGS algorithm, which will not be enumerated herein.

For example, the steepest descent algorithm may also be referred to as gradient algorithm, in which the optimal value is searched simply along the negative direction of the gradient when solving the unconstrained problem of minimizing the energy of the connection curve in the ambient field. The Newton algorithm uses a quadratic function consisting of a Hessian matrix and the gradient of an objective function to search the extremum values and after each step a new quadratic function is recalculated to search the optimal value.

Step S170: performing image filling on the registered image blocks to acquire a restored image.

In this embodiment, the seams among the registered image blocks may be filled such that a plurality of image blocks form a complete image.

The image restoration methods mentioned above may be used to restore both broken two dimensional images and broken three dimensional images, which will not be described in details herein.

Figure 2:
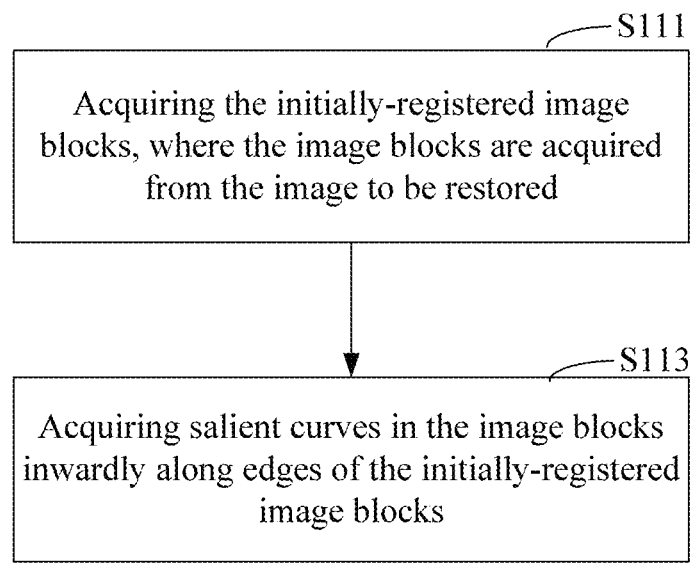
FIG. 2 is a flow chart of the method for processing the image blocks which are initially registered to acquire the connection curves between the image blocks in FIG. 1.

As shown in FIG. 2, in one embodiment, the step S110 mentioned above may include:

Step S111: acquiring the initially-registered image blocks which may be acquired from the image to be restored.

Figure 3A:
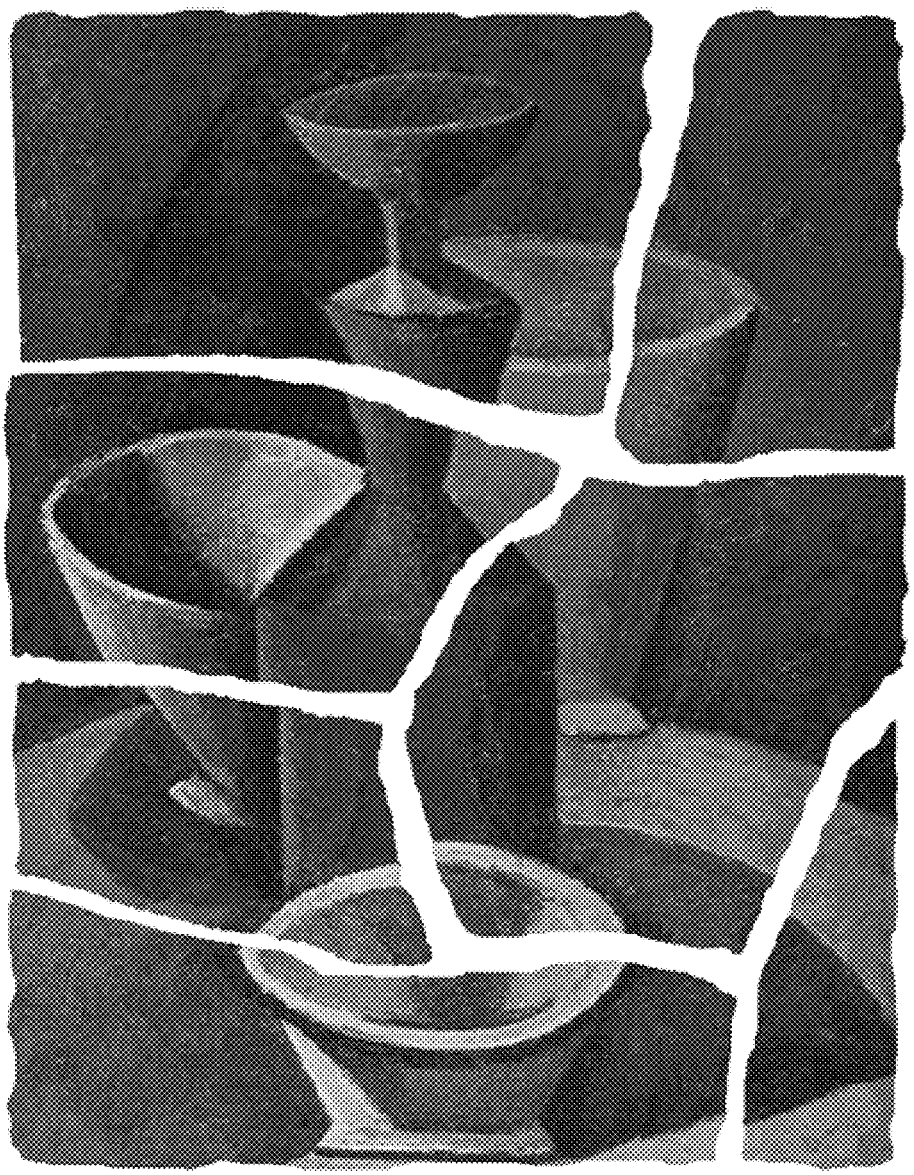
FIG. 3a is a schematic diagram showing the image blocks which are initially registered according to an embodiment.

In this embodiment, a plurality of image blocks of a broken image may be initially registered roughly by user-triggered operations to acquire the initially-registered image blocks, as shown in FIG. 3a.

Step S113: acquiring salient curves in the image blocks inwardly along edges of the initially-registered image blocks.

Figure 3B:

In this embodiment, line segments, i.e., the salient curves, in the image blocks may be acquired by certain algorithms or interaction, for example, by intelligent scissor methods interactively input by the user or methods for calculating salient curves in the image blocks. According to the intelligent scissor methods, a series of seed points selected by the user in the images may be acquired, and then paths with minimum energy between adjacent seed points may be obtained to automatically connect the seed points to acquire corresponding curves, which may be the salient curves, as shown in FIG. 3b.

In addition, in some preferred embodiments, the salient curves may also be acquired by edge preserving filtering, partial derivative, boundary extraction and processing on boundary, etc.

Figure 4:
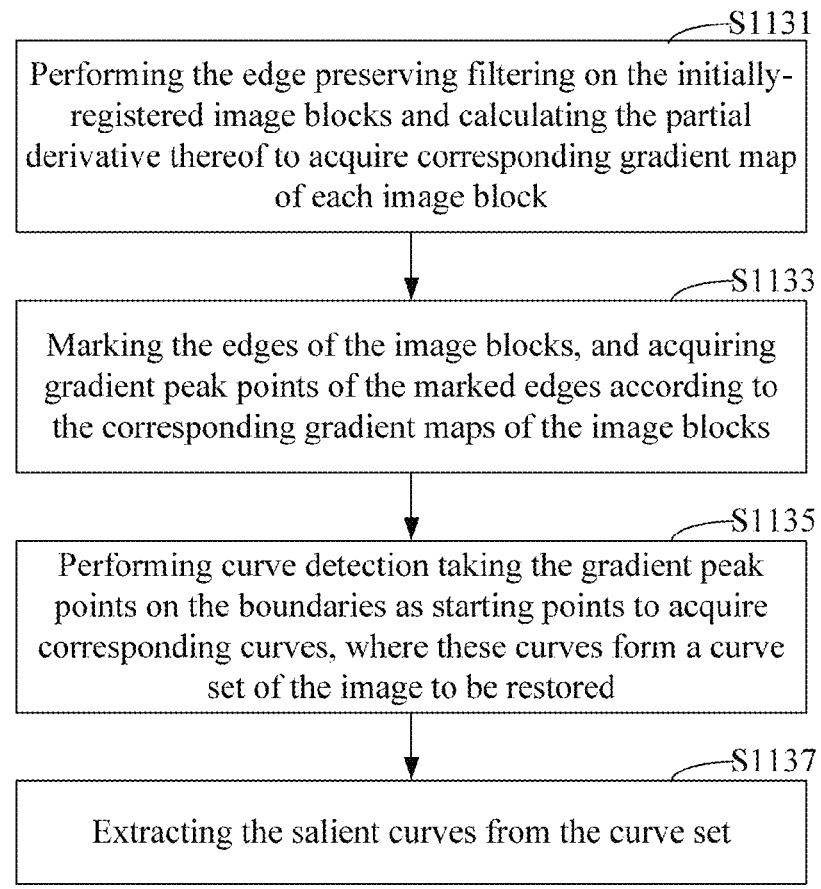
FIG. 4 is a flow chart of the method for acquiring the salient curves in the image blocks inwardly along the edges of the image blocks which are initially registered in FIG. 2.

As shown in FIG. 4, in one embodiment, the step S113 mentioned above may include:

Step S1131: performing the edge preserving filtering on the initially-registered image blocks and calculating the partial derivative thereof to acquire corresponding gradient map of each image block.

In this embodiment, the algorithms used for the edge preserving filtering may be weighted least square filtering, anisotropic diffusion, robust smoothing and bilateral filtering, etc, which will not be enumerated herein.

The edge preserving filtering may be performed on each of the image blocks which are initially registered by any of the algorithms mentioned above, and the corresponding gradient maps of the image blocks may be acquired by calculating the partial derivative of the edge preserving filtered image blocks.

Step S1133, marking the edges of the image blocks, and acquiring gradient peak points of the marked edges according to the corresponding gradient maps of the image blocks.

In this embodiment, the boundary extraction may be performed on each image blocks and the extracted boundaries may be marked. Specifically, it will be assumed that the image blocks which are initially registered are in white background. In this case, the extraction of the boundaries may be achieved by applying certain boundary extraction algorithms. For example, the applied extraction algorithms may be simple two-valued segmentation method or dynamic contour method.

Step S1135: performing curve detection taking the gradient peak points on the boundaries as starting points to acquire corresponding curves, where these curves form a curve set of the image to be restored.

In this embodiment, the peak points of the gradient may be found out along the boundaries of the image blocks. Then, curve detection may be perform by several steps along the direction with maximum gradient from the peak points which are taken as starting points to inside of the image blocks to acquire corresponding curves. In this case, a plurality of curves may be acquired to form corresponding curve set of the image to be restored.

Step S1137: extracting the salient curves from the curve set.

In this embodiment, score corresponding to each curve of the curve set may be calculated, i.e., score(s)=len(s)+grad(s)+orth(s)−curv(s), where len(s) is the length of the curve, grad(s) is the sum of the gradient value of all pixels on the curve, orth(s) is a sine value of an angle between the curve and the tangent of the boundary at the starting point of the curve, and curv(s) is a mean curvature of the curve. In addition, each of the four terms mentioned above may be divided by corresponding maximum thereof to ensure that it is in the range of [0, 1].

The salient curves may be acquired by filtering the curves in the curve set with the calculated scores.

Specifically, after the score of each curve in the curve set is calculated, it will be determined whether the score is greater than a threshold. When it is not, the corresponding curve is discarded. When it is, the corresponding curve is retained. Finally, the retained curves are the salient curves. In one embodiment, the threshold may be 1.0.

Step S115: acquiring interrelated salient curves according to the salient curves and acquiring connection curves between the interrelated salient curves.

Figure 3C:
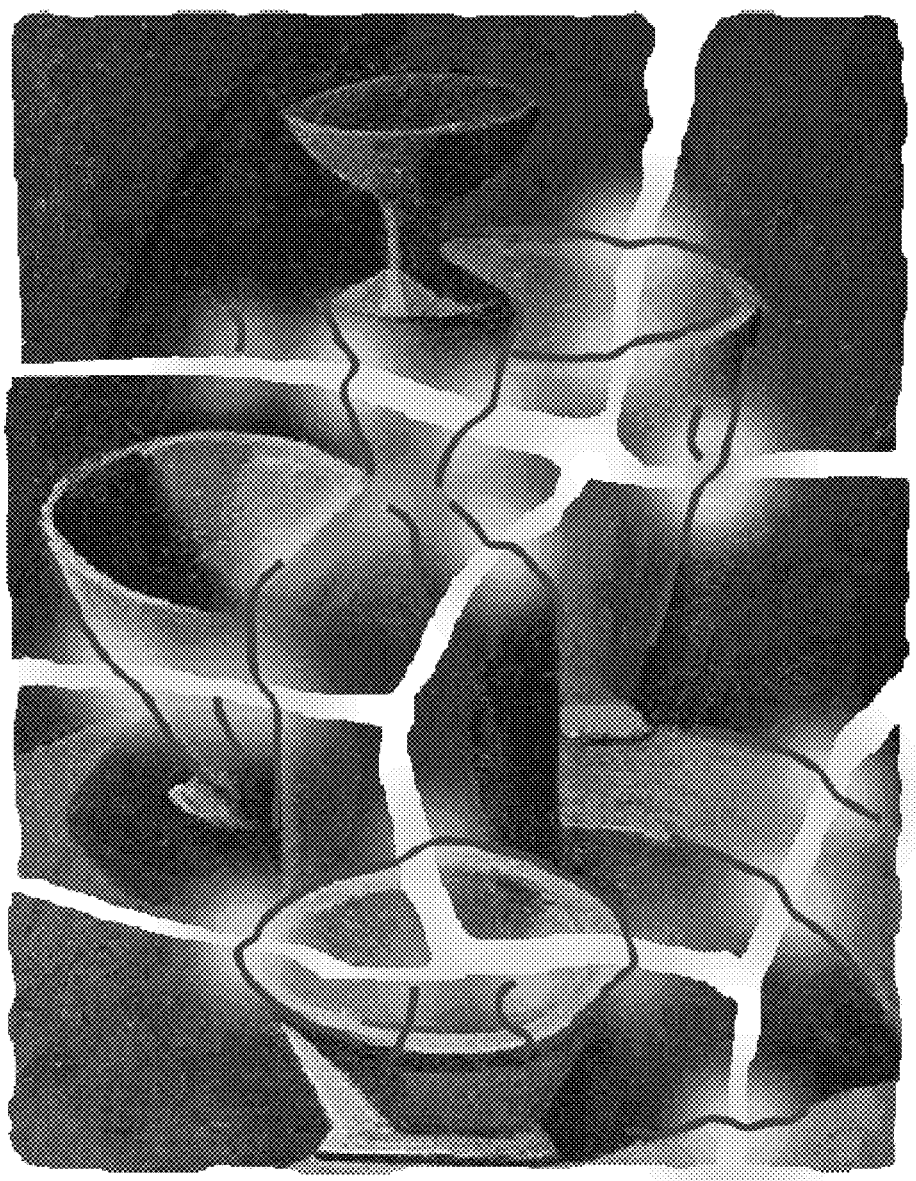
FIG. 3c is a schematic diagram showing the connection curves in FIG. 3b.

In this embodiment, the interrelated salient curves may be the salient curves located in different image blocks whose starting points have correspondence relationship. The curve connecting two interrelated salient curves may be the connection curve. Furthermore, the connection curves are also the curves connecting two image blocks and are located in seams among the image blocks, as shown in FIG. 3c.

Figure 3D:
FIG. 3d is a schematic diagram showing the ambient field constructed by FIG. 3c.
Figure 3E:
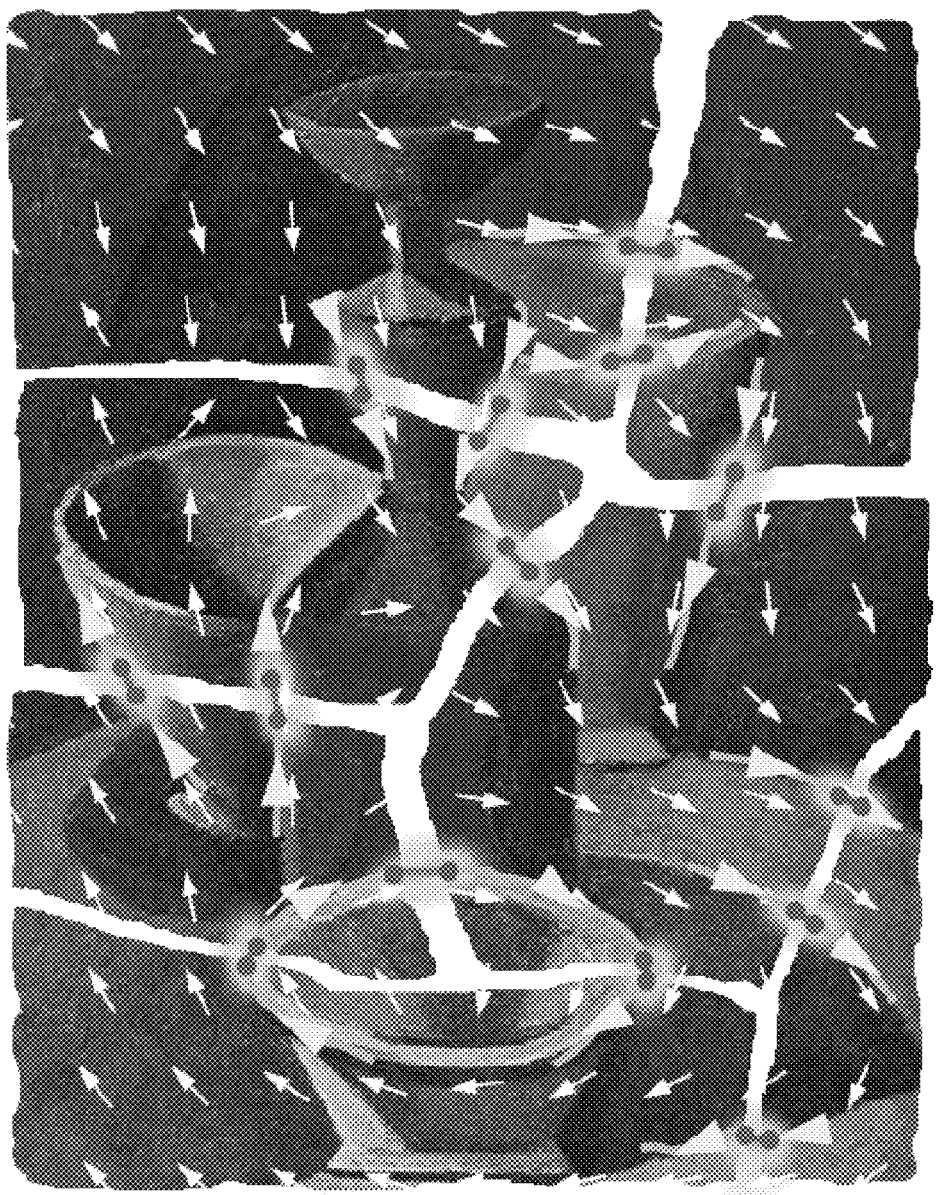
FIG. 3e is a schematic diagram showing the image blocks which are registered.
Figure 3F:
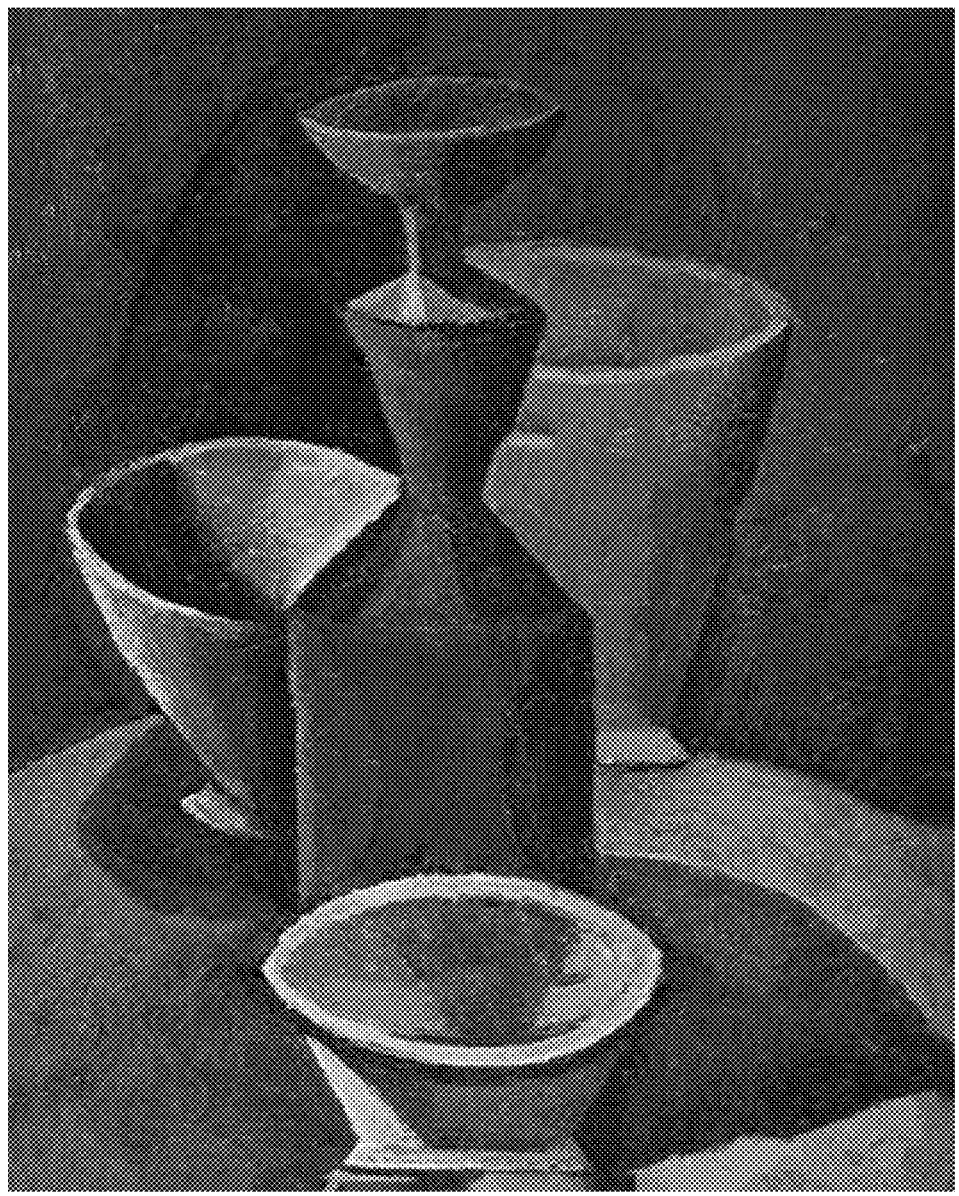
FIG. 3f is a schematic diagram showing the filled image blocks.

The ambient field of the image to be restored constructed in the step S130 mentioned above is shown in FIG. 3d, and the image blocks which are registered by minimizing the energy of the connection curves in the ambient field in the step S150 mentioned above are shown in FIG. 3e. And then, the complete image as shown in FIG. 3f may be acquired by corresponding filling. Thus, the broken image without overlapping area can be actually restored and the accuracy of the image restoration is increased.

In one embodiment, the step S115 may include:

finding out the correspondence relationship between the starting points of the salient curves by a robust algorithm, where the starting points between which there is a correspondence relationship are located on different salient curves which in turn are located in different image block.

Figure 5A:
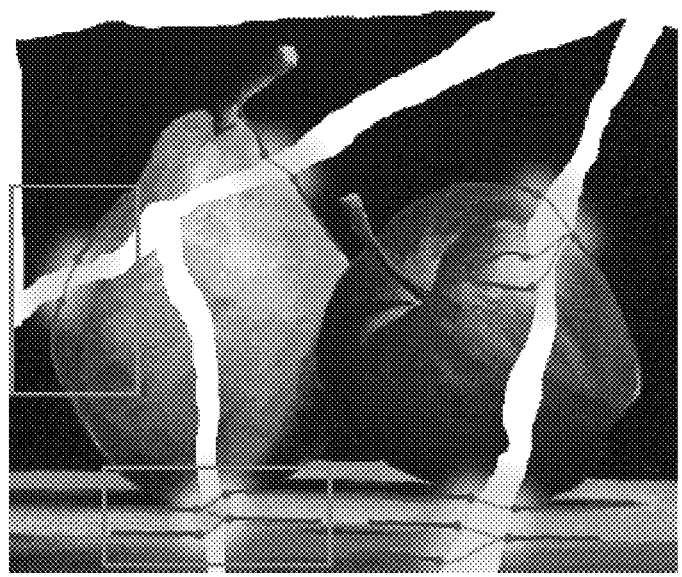
FIG. 5a is a schematic diagram showing the interrelated salient curves according to an embodiment.

In this embodiment, the salient curves on which the starting points between which there is a correspondence relationship are located may be the interrelated salient curves, and the curves between the interrelated salient curves may be connection curves. In preferred embodiments, the connection curve may be Hermite curve. For example, the salient curves shown within the boxes in FIG. 5a are the interrelated salient curves.

Several salient curves of the image to be restored may be paired to acquire the starting points between which there is a correspondence relationship, while the salient curves on which the starting points between which there is a correspondence relationship are located are the interrelated salient curves. And then, two interrelated salient curves may be connected by a smooth Hermite curve. The Hermite curve is the connection curve which may pass through the seam between the image blocks to connect two image blocks.

Figure 6:
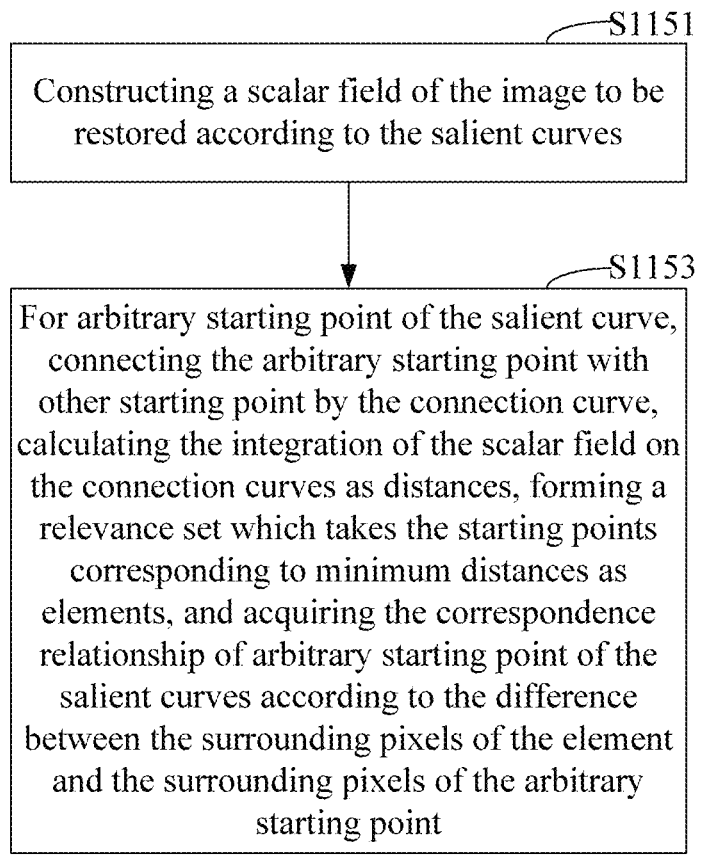
FIG. 6 is a flow chart of the method for finding out the correspondence relationship between the starting points of the salient curves by a robust algorithm according to an embodiment.

As shown in FIG. 6, in one embodiment, the step of finding out the correspondence relationship between the starting points of the salient curves by a robust algorithm mentioned above may include:

Step S1151: constructing a scalar field of the image to be restored according to the salient curves.

In this embodiment, the scalar field of the image to be restored may be constructed by following formula:

$$l(r) = \frac{1}{n}\sum_{j=1}^{n} \exp\left(-\frac{|r-a_j|^2}{\varpi_1^2}\right)\exp\left(-\frac{|r-e_j|^2}{\sigma_1^2}\right).$$

Where n is the number of the salient curves, r is any point in the space, $e_j$ is the starting point of the curve j, $a_j$ is a projection of r on the outward closely tangent arc of the curve j at the starting point, and $\sigma_1$ is a control parameter which is 0.05 by default.

Step S1153: for arbitrary starting point of the salient curve, connecting the arbitrary starting point with other starting point by the connection curve, calculating the integration of the scalar field on the connection curves as distances, forming a relevance set which takes the starting points corresponding to minimum distances as elements, and acquiring the correspondence relationship of arbitrary starting point of the salient curves according to the difference between the surrounding pixels of the element and the surrounding pixels of the arbitrary starting point.

In this embodiment, the salient curve may include the starting points located at two end of the line segment, respectively. For any one of the starting points, it may be connected with other starting point around and the line segment connecting two starting points is the connection curve. In this case, the two starting points between which the distance is minimum may be the starting points between which there is a correspondence relationship.

Further, in order to ensure an accurate acquirement of the correspondence relationship, for any one of the starting points, firstly the starting point may be connected with other starting point by a smooth Hermite curve, where such other starting point is located on a different salient curve which in turn is located in a different image block from the starting point. And then, the integration of the scalar field on this Hermite curve may be calculated and taken as the distance between these two starting points, rather than simply applying the distance between two points.

Figure 5B:
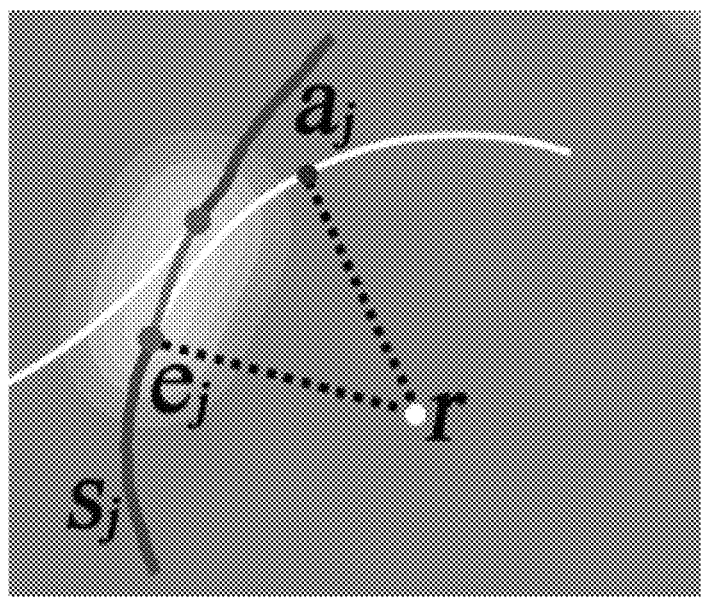

As shown in FIG. 5b, in the scalar field, an arbitrary starting point may be connected with another starting point which has minimum distance to the arbitrary starting point to perform the calculation of the distance.

Figure 5C:
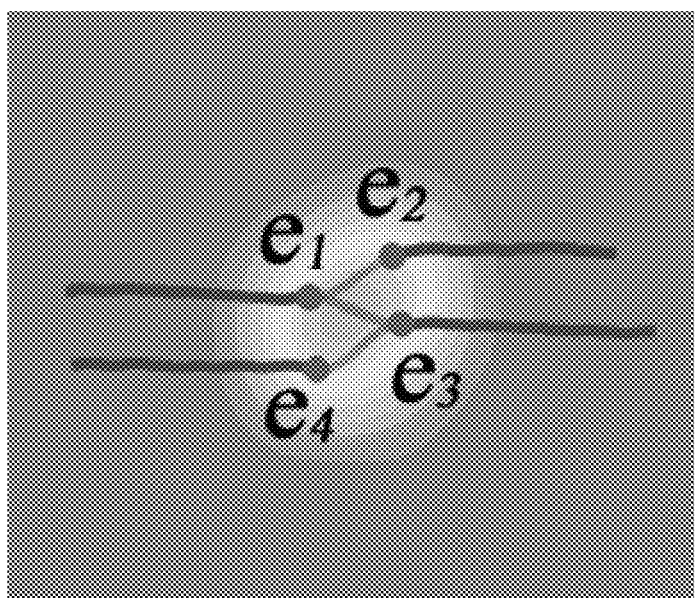
FIG. 5c is a schematic diagram showing the relevance set formed in FIG. 5b.

In this case, the starting points corresponding to the minimum distances may be extracted to form a relevance set which takes the extracted starting points as elements. As shown in FIG. 5c, the formed relevance set may include several elements. Thus, the elements need to be further extracted.

Figure 5D:
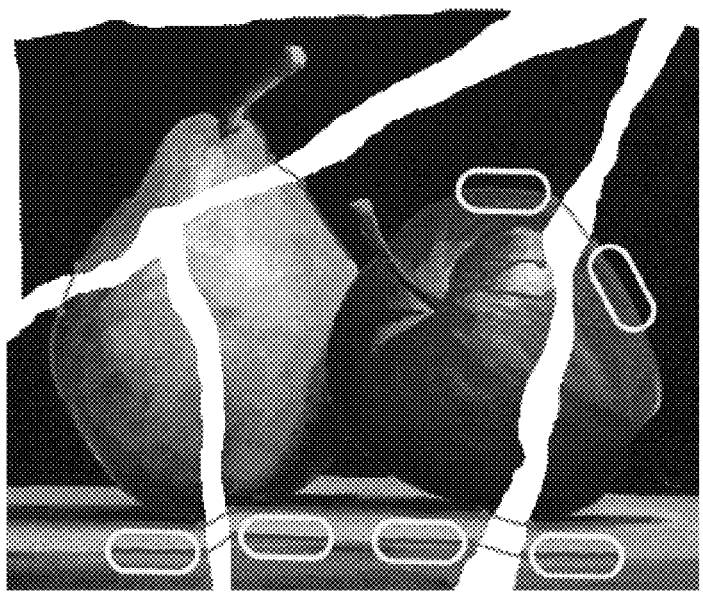
FIG. 5d is a schematic diagram showing the interrelated salient curves acquired by selecting from the relevance set of FIG. 5c.

Specifically, the surrounding pixels of each element of the relevance set may be compared with the surrounding pixels of the starting point to acquire the differences, and the element corresponding to the minimum difference may be retained while other elements may be removed from the relevance set. In this case, there is a correspondence relationship between the retained element, i.e., the starting point, and present starting point. As shown in FIG. 5d, the two salient curves within two boxes connected by the connection curve are the related salient curves.

Figure 7:
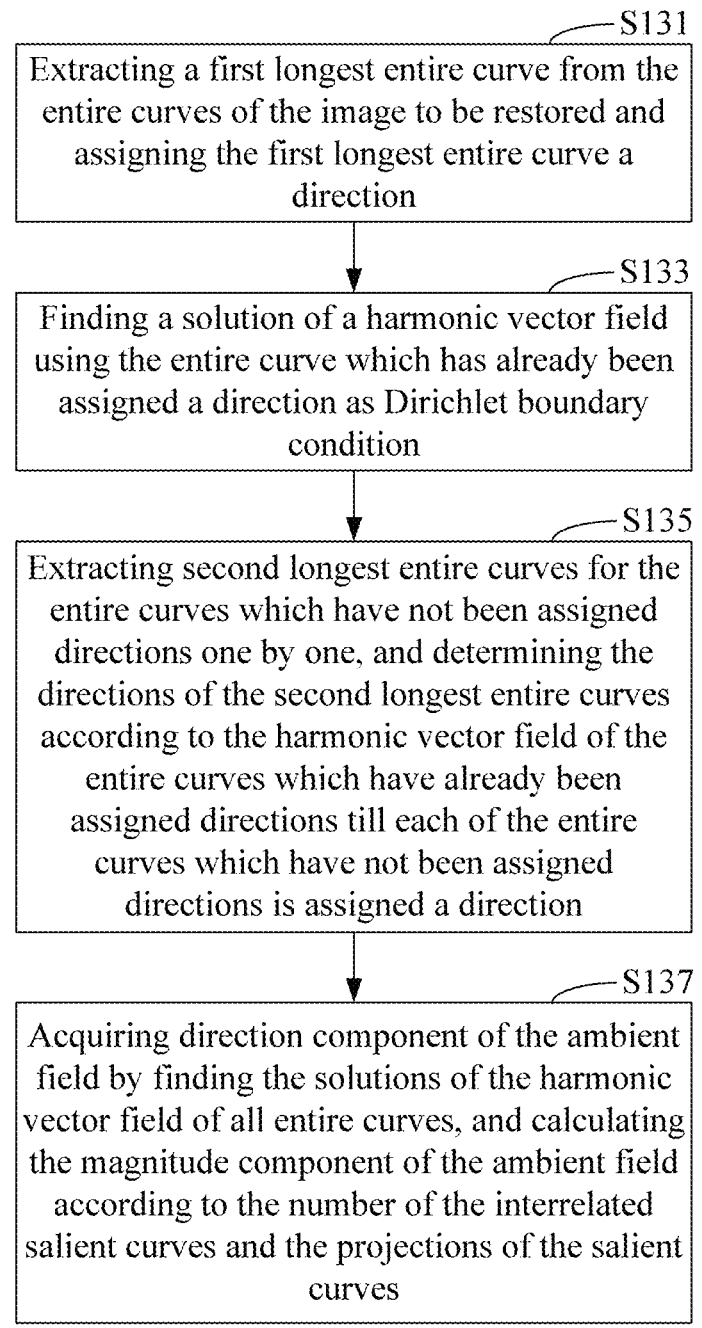
FIG. 7 is a flow chart of the method for constructing the ambient field of the image to be restored by means of the connection curves in FIG. 1.

As shown in FIG. 7, in one embodiment, the step S130 mentioned above may include:

Step S131: extracting a first longest entire curve from the entire curves of the image to be restored and assigning the first longest entire curve a direction.

In this embodiment, the entire curve of the image to be restored may be formed by the interrelated salient curves and the connection curve connecting the interrelated salient curves. A longest entire curve may be extracted from a plurality of entire curves. The extracted longest entire curve may be the first longest entire curve and a random direction may be assigned to the first longest entire curve.

Step S133: finding a solution of a harmonic vector field using the entire curve with direction as Dirichlet boundary condition.

In this embodiment, the solution of the harmonic vector field may be found using the extracted first longest entire curve as the Dirichlet boundary condition.

Step S135: extracting second longest entire curves for the entire curves which have not been assigned directions one by one, and determining the directions of the second longest entire curves according to the harmonic vector field of the entire curves which have already been assigned directions till each of the entire curves which have not been assigned directions is assigned a direction.

In this embodiment, the extracted first longest entire curve is assigned a direction and the magnitude component of the harmonic vector field is correspondingly solved. At this time, all of the remaining entire curves are non-directional. Therefore, the remaining entire curves will be assigned directions one by one.

Specifically, a longest entire curve may be extracted from the entire curves without directions. The extracted entire curve may be the second longest entire curve. The direction of the second longest entire curve may be determined according to the harmonic vector field of the entire curve with direction. Then, the extraction of the entire curve and determination of the direction may be performed repeatedly, until each of the entire curves has been assigned a direction. Each time the extracted longest entire curve is the second longest entire curve.

Further, determining the direction of the second longest entire curve according to the harmonic vector field of the entire curve with direction may include: testing the degree of consistency of the second longest entire curve with the harmonic vector field of the entire curve with direction in the extending direction of the second longest entire curve and in the reverse direction of the extending direction of the second longest entire curve, taking the direction with maximum degree of consistency as the direction of the second longest entire curve, and calculating the harmonic vector field of the entire curve with direction, and so on, until each of the entire curves is assigned a direction.

Step S137: acquiring direction component of the ambient field by finding the solutions of the harmonic vector field of all entire curves, and calculating the magnitude component of the ambient field according to the number of the interrelated salient curves and the projections of the salient curves.

In this embodiment, the direction component of the ambient field may be acquired by finding the solutions of the harmonic vector field of all entire curves using all entire curves as the Dirichlet boundary conditions, and the magnitude component of the ambient field may be calculated by following formula:

$$d(r) = \frac{1}{k}\sum_{j=1}^{k} \exp\left(-\frac{r-a_j}{\sigma_2^2}\right)\exp\left(-\frac{|r-a_{m(j)}|^2}{\sigma_2^2}\right).$$

Where k is the number of the salient curve pairs which are interrelated, ma) is an curve index associated with the connection curve j, $a_j$ is a projection of r on the outward closely tangent arc of the connection curve j at the starting point, and $\sigma_2$ is a control parameter which is 0.01 by default.

In one embodiment, the step S150 mentioned above may include:

acquiring a transformation corresponding to the image blocks by minimizing the energy of the connection curve in the ambient field, acquiring the translation and rotation of the connection curve according to the transformation corresponding to the image blocks, and registering the image blocks according to the translation and rotation of the connection curve.

In this embodiment, the registering of the image blocks is performed under the guidance of the ambient field. That is, the transformation T to the image blocks may be acquired, and then all of the directions corresponding to the connection curves may be caused to be as consistent as possible with the direction of the ambient field. Since the transformation to the image blocks will affect the location and angle of the connection curve and thereby determine the parameters of the connection curve, the connection curves used for connecting the salient curves essentially are functions of the transformation T to the image blocks, i.e. H(T). In this case, related optimization formulas may be acquired:

$$T = \operatorname{argmin}_T E(H(T))$$
$$E(H(T)) = \sum_{i=1}^{k} \int_{h_i(T)} f(r)dr$$
$$f(r) = 1 - t(r)^T V(r) + \lambda(1 - d(r)).$$

Where $h_i$ is the ith element of H, t(r) is a tangential direction of $h_i$ at the point r, $\lambda$ is a parameter for adjusting the weights of two terms and is 0.1 by default, v(r) is the direction component of the vector at the point r, and d(r) is the magnitude component of the vector at the point r.

In preferred embodiments, the optimization formulas mentioned above may be solved using BFGS optimization algorithm to acquire the location and angle of the transformation of the connection curve, and then the locations of the image blocks may be adjusted according to the location and angle of the transformation of the connection curve to acquire the transformation of the image blocks. The transformed image blocks are the registered image blocks.

Figure 8A:
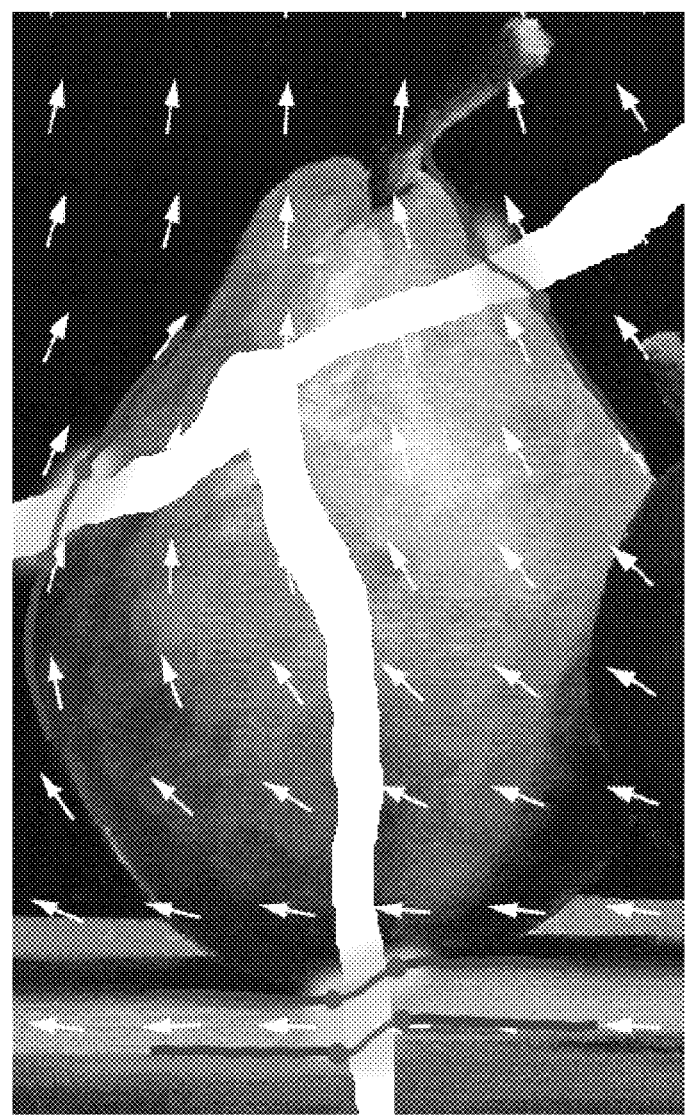
FIG. 8a is a schematic diagram showing the image blocks which are not registered according to an embodiment.
Figure 8B:
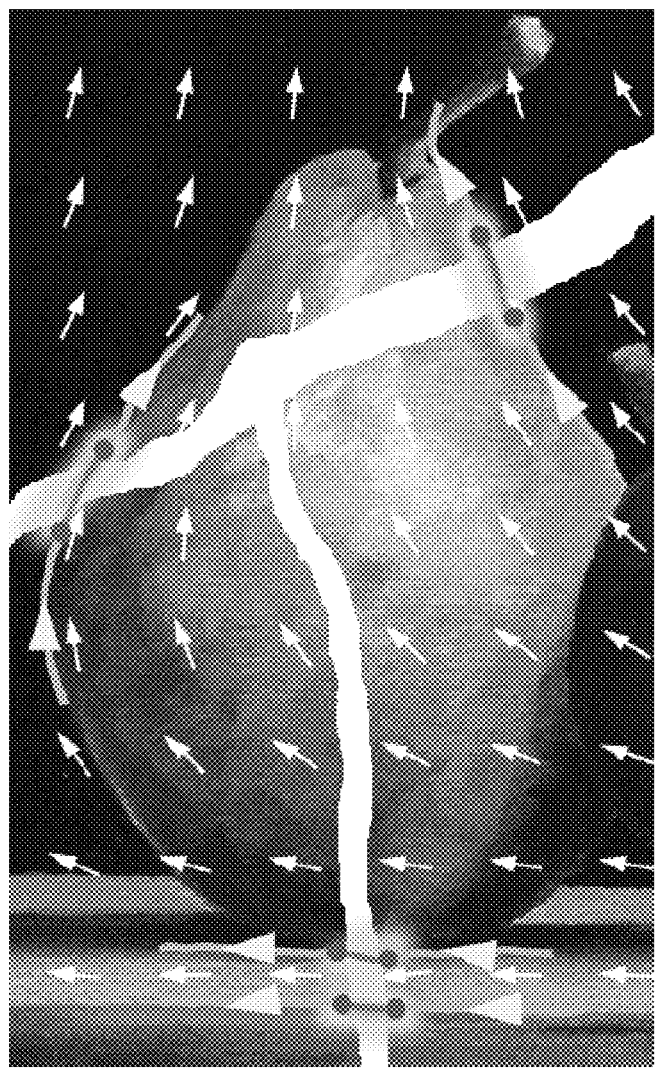

As shown in FIG. 8a, after registering the image blocks by the transformation acquired by the optimization algorithm, the registered image blocks as shown in FIG. 8b may be acquired.

Figure 9:
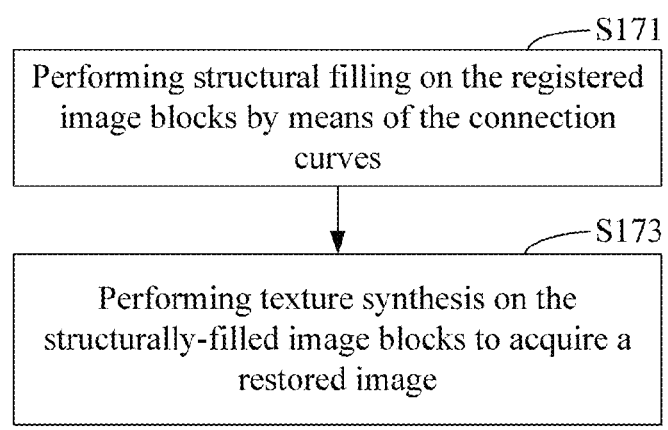
FIG. 9 is a flow chart of the method for performing image filling on the image blocks which are registered to acquire the restored image in FIG. 1.

As shown in FIG. 9, in one embodiment, the step S170 mentioned above may include:

Step S171: performing structural filling on the registered image blocks by means of the connection curves.

In this embodiment, there are seams among the registered image blocks, therefore the registered image blocks need to be filled to acquire a complete image. Specifically, the structural filling may be performed using the connection lines between the image blocks in order to restore the image to be restored in accordance with the structure of the image, thereby the structure of the image may be retained with greatest extent possible and blurring of the structure of the image in the filled area as traditional image filling methods will not occur.

Figure 10:
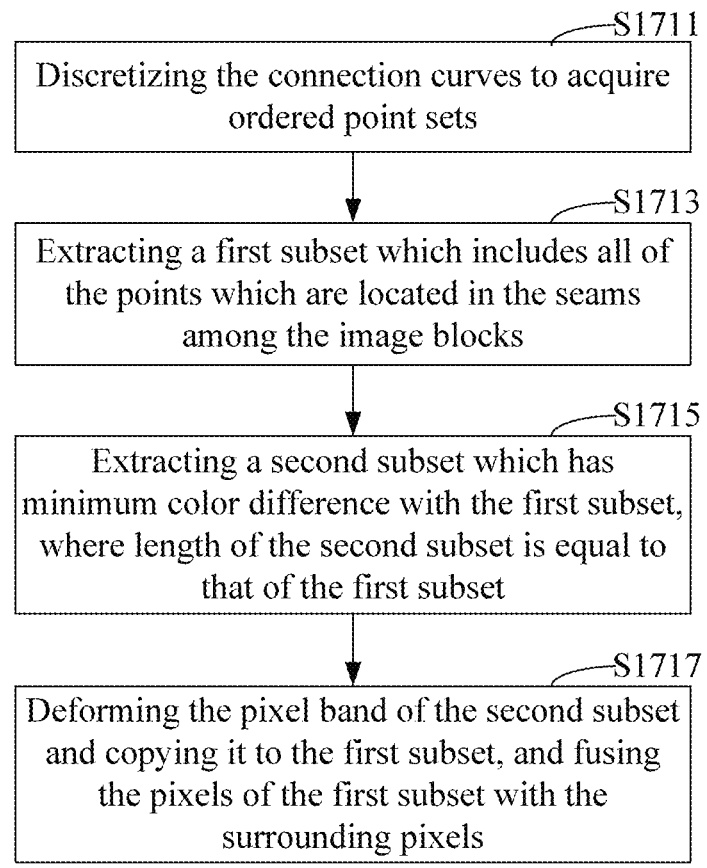
FIG. 10 is a flow chart of the method for performing structural filling on the image blocks which are registered by means of the connection curves in FIG. 9.

As shown in FIG. 10, in one embodiment, the step S171 mentioned above may include:

Step S1711: discretizing the connection curves to acquire ordered point sets.

In this embodiment, the connection curve between the image blocks may be discretized to acquire a ordered point set P={P1, P2, . . . , Pn}.

Step S1713: extracting a first subset which includes all of the points which are located in the seams among the image blocks.

In this embodiment, a subset may be selected from the ordered point set to acquire the first subset P'={Pi, Pi+1, Pi+2 . . . , Pi+m}. The first subset may includes all of the points located in the seams in the order point set, as shown in FIG. 11.

Step S1715: extracting a second subset which has minimum color difference with the first subset, where the length of the second subset may be equal to that of the first subset.

Figure 11:
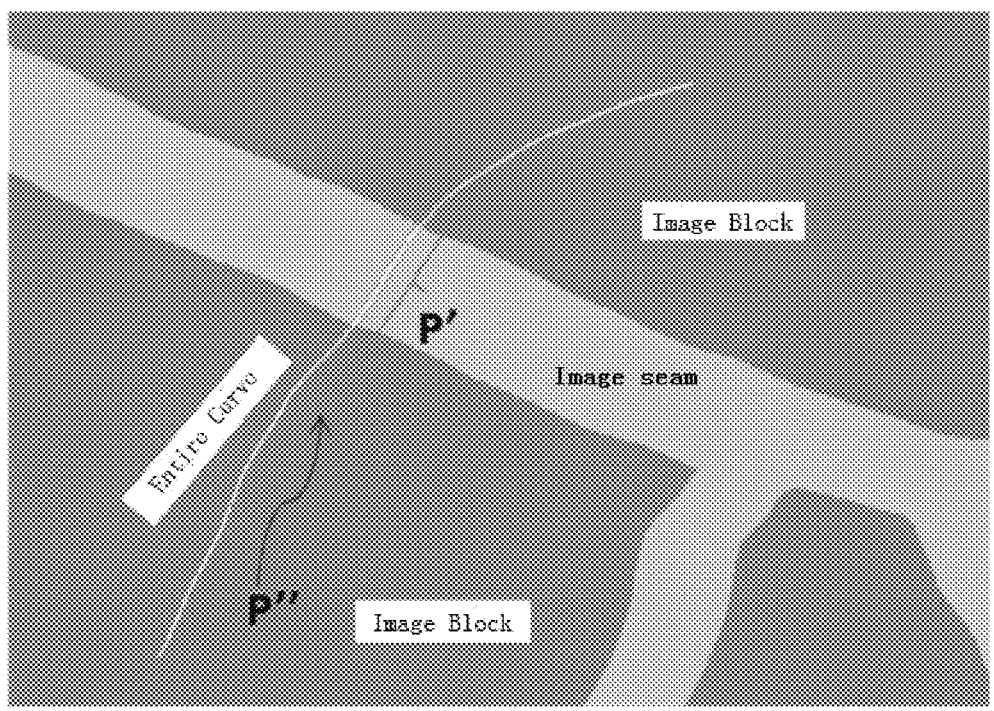
FIG. 11 is a schematic diagram of the structural filling in FIG. 10.

In this embodiment, a subset may be extracted from the ordered point set again to acquire the second subset which has minimum color difference with the first subset, i.e., P'''={Pk, Pk+1, . . . , Pk+m} as shown in FIG. 11.

The process of extracting the second subset from the ordered point set is actually a process of searching the pixel block which is similar to the seam in which the first subset is located along the entire curve.

Specifically, a pixel band may be extracted from the entire curve containing the connection curve and the extracted pixel band may be deformed, taking the first subset as target point set, to acquire a deformed pixel band. The deformed pixel band has a minimum color difference with the surrounding pixels of the first subset, i.e. the pixels of the first subset which are located in the image blocks, so as to seamlessly stitch the image blocks.

Where the transformation performed on the extracted pixel band, i.e. the second subset, may be moving least squares deformation or other algorithms, for example, thin plate spline function method and radial basis function method, etc.

The thin plate spline function method is an interpolation method for searching a smooth curved surface with minimum bending which passes through all control points as a thin plate. It is achieved by several given "spline" that the surface of the thin plate is smooth, and the extent of the minimum bending is defined by an energy function.

Specifically, the deformation performed on the second subset by the thin plate spline function method may be that regarding the whole image to be restored as a xoy plan in a three-dimensional space, the control points may be moved along a z direction and the displacements of other points may be calculated by the interpolation using the thin plate spline function, thereby the displacements of all pixels in all of the second subsets may be calculated to achieve the deformation of the image.

The radial basis function method is mainly used for solving the interpolation problem. Because the radial basis function is only related to a distance to a certain point, it is referred to as radial. Because the radial basis function is the basis for approximating functions in the function space, it is referred to as radial basis.

When deforming the second subset using the radial basis function method, the image to be restored is regarded as a xoy plane in a three-dimensional space and the control points are moved along a z direction. In this case, the displacements of other points may be calculated by interpolation using the radial basis function, thereby the displacements of all pixels may be acquired and the deformation of the image may be achieved.

Step S1717: deforming the pixel band of the second subset and copying it to the first subset, and fusing the pixels of the first subset with the surrounding pixels.

In this embodiment, the pixel band corresponding to the second subset may, after being deformed, be seamlessly cloned to the seam in which the first subset is located. In preferred embodiments, Poisson fusion method may be used such that the filling will be more realistic and natural.

Step S173: performing texture synthesis on the structurally-filled image blocks to acquire a restored image.

In this embodiment, the texture synthesis may be performed on the image blocks which are structurally filled to achieve the filling of other portions of the image to be restored.

Specifically, the texture synthesis of the image to be restored may be achieved by a content-aware-based filling method to acquire the restored image. Achieving the texture synthesis of the image blocks using the content-aware-based filling method mainly includes that when calculating a restored value for a missing pixel, all of the closest known blocks of the image block containing it are calculated, and an optimization value for this missing pixel may be acquired by summing the color values of these known blocks.

In preferred embodiments, an acceleration operation may further be introduced into the content-aware-based filling process to achieve the quick searching of the closest known blocks by a combination of neighbor recommendation and random searching.

Figure 12:
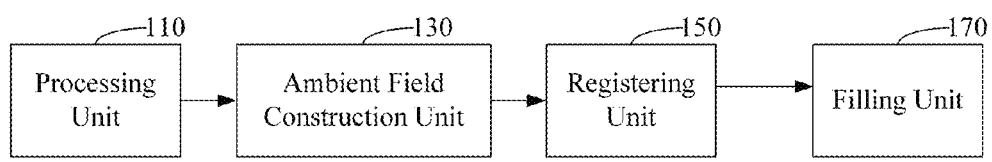
FIG. 12 is schematic diagram of the structure of the image restoration device according to an embodiment.

As shown in FIG. 12, in one embodiment, an image restoration device may include a processing unit 110, an ambient field construction unit 130, a registering unit 150 and a filling unit 170.

The processing unit 110 may be used for processing the image blocks which are initially registered to acquire the connection curves between the image blocks.

In this embodiment, the image blocks which are initially registered may be obtained from image fragments of the image to be restored. These initially-registered image blocks form the image to be restored. Specifically, the initially-registered image blocks may be rough arrangement of the image blocks done by the user. The connection curves obtained by processing the initially-registered image blocks may be located in seams among the image blocks and used for associating image blocks which are in broken state with each other.

The ambient field construction unit 130 may be used for constructing the ambient field of the image to be restored by means of the connection curves.

In this embodiment, the ambient field may include a magnitude component and a direction component and may be used for indicating magnitudes and directions of the energy of the curves in the image to be restored.

The registering unit 150 may be used for registering the image blocks by minimizing the energy of the connection curves in the ambient field.

In this embodiment, the registering unit 150 may use certain optimization algorithms to minimize the energy of the connection curve in the ambient field, thereby it may be ensured based on this numerical optimization that the energy of the connection curve in the ambient field can be at least converged to local optimal result. The registering of the image blocks may be achieved by means of the minimized connection curve, thereby the registering of the image blocks will not be deviated and the accuracy of the registering of the image to be restored may be increased.

The optimization algorithms used by the registering unit 150 for the registering of the image blocks may be steepest descent algorithm, Newton algorithm and BFGS algorithm, which will not be enumerated herein.

For example, the steepest descent algorithm may also be referred to as gradient algorithm, in which the optimal value is searched simply along the negative direction of the gradient when solving the unconstrained problem of minimizing the energy of the connection curve in the ambient field. The Newton algorithm uses a quadratic function consisting of a Hessian matrix and the gradient of an objective function to search the extremum values and after each step a new quadratic function is recalculated to search the optimal value.

The filling unit 170 may be used for performing the image filling on the registered image blocks to acquire the restored image.

In this embodiment, the filling unit 170 may fill the seams among the registered image blocks such that a plurality of image blocks form a complete image.

The image restoration devices mentioned above may be used to restore both broken two dimensional images and broken three dimensional images, which will not be described in details herein.

Figure 13:
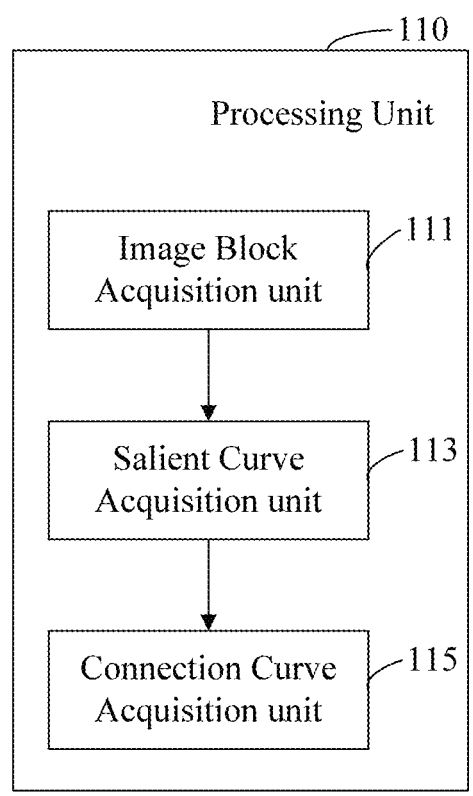
FIG. 13 is a schematic diagram of the structure of the processing unit in FIG. 12.

As shown in FIG. 13, in one embodiment, the process unit 110 mentioned above may include: an image block acquisition unit 111, a salient curve acquisition unit 113 and a connection curve acquisition unit 115.

The image block acquisition unit 111 may be used for acquiring the initially-registered image blocks which may be acquired from the image to be restored.

In this embodiment, a plurality of image blocks of a broken image may be initially registered roughly by user-triggered operations to acquire the initially-registered image blocks.

The salient curve acquisition unit 113 may be used for acquiring salient curves in the image blocks inwardly along edges of the initially-registered image blocks.

In this embodiment, the salient curve acquisition unit 113 may acquire line segments, i.e., the salient curves, in the image blocks by certain algorithms or interaction, for example, by intelligent scissor methods interactively input by the user or methods for calculating salient curves in the image blocks. According to the intelligent scissor methods, a series of seed points selected by the user in the images may be acquired, and then paths with minimum energy between adjacent seed points may be obtained to automatically connect the seed points to acquire corresponding curves, which may be the salient curves.

In addition, in some preferred embodiments, the salient curve acquisition unit 113 will acquire the salient curves by edge preserving filtering, partial derivative, boundary extraction and processing on boundary, etc.

Figure 14:
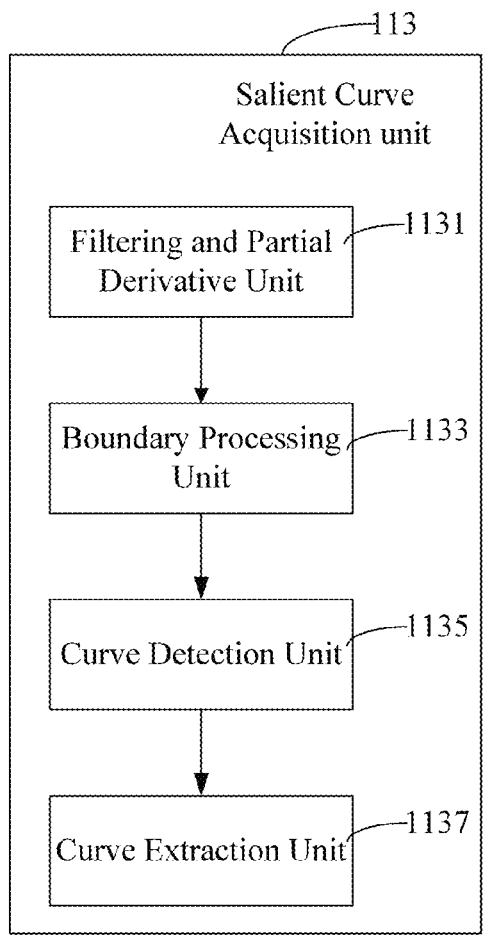
FIG. 14 is a schematic diagram of the structure of the salient curve acquisition unit in FIG. 13.

As shown in FIG. 14, in one embodiment, the salient curve acquisition unit 113 may include a filtering and partial derivative unit 1131, a boundary processing unit 1133, a curve detection unit 1135 and a curve extraction unit 1137.

The filtering and partial derivative unit 1131 may be used for performing the edge preserving filtering on the initially-registered image blocks and calculating the partial derivative thereof to acquire corresponding gradient map of each image block.

In this embodiment, the algorithms used by the filtering and partial derivative unit 1131 to achieve the edge preserving filtering may be weighted least square filtering, anisotropic diffusion, robust smoothing and bilateral filtering, etc, which will not be enumerated herein.

The filtering and partial derivative unit 1131 may perform the edge preserving filtering on each of the image blocks which are initially registered by any of the algorithms mentioned above, and acquire the corresponding gradient maps of the image blocks by calculating the partial derivative of the edge preserving filtered image blocks.

The boundary processing unit 1133 may be used for marking the edges of the image blocks and acquiring gradient peak points of the marked edges according to the corresponding gradient maps of the image blocks.

In this embodiment, the boundary processing unit 1133 may perform the boundary extraction on each image blocks and mark the extracted boundaries. Specifically, the boundary processing unit 1133 will assume that the image blocks which are initially registered are in white background. In this case, the extraction of the boundaries may be achieved by applying certain boundary extraction algorithms. For example, the extraction algorithms used by the boundary processing unit 1133 may be simple two-valued segmentation method or dynamic contour method.

The curve detection unit 1135 may be used for performing curve detection taking the gradient peak points on the boundaries as starting points to acquire corresponding curves. These curves form the curve set of the image to be restored.

In this embodiment, the curve detection unit 1135 may find out the peak points of the gradient along the boundaries of the image blocks, and then detect by several steps along the direction with maximum gradient from the peak points which are taken as starting points to inside of the image blocks to acquire corresponding curves. In this case, a plurality of curves may be acquired to form corresponding curve set of the image to be restored.

The curve extraction unit 1137 may be used for extracting the salient curves from the curve set.

In this embodiment, the curve extraction unit 1137 may calculate the score corresponding to each curve of the curve set, i.e., $score(s)=len(s)+grad(s)+orth(s)-curv(s)$, where $len(s)$ is the length of the curve, $grad(s)$ is the sum of the gradient value of all pixels on the curve, $orth(s)$ is a sine value of an angle between the curve and the tangent of the boundary at the starting point of the curve, and $curv(s)$ is a mean curvature of the curve. In addition, each of the four terms mentioned above may be divided by corresponding maximum thereof to ensure that it is in the range of [0, 1].

The curve extraction unit 1137 may filter the curves in the curve set with the calculated scores to acquire the salient curves.

Specifically, after the score of each curve in the curve set is calculated, the curve extraction unit 1137 will determine whether the score is greater than the threshold. When it is not, the corresponding curve is discarded. When it is, the corresponding curve is retained. Finally, the retained curves are the salient curves. In one embodiment, the threshold may be 1.0.

The connection curve acquisition unit 115 may be used for acquiring interrelated salient curves according to the salient curves and acquiring connection curves between the interrelated salient curves.

In this embodiment, the interrelated salient curves may be the salient curves located in different image blocks whose starting points have correspondence relationship. The curve connecting two interrelated salient curves may be the connection curve. Furthermore, the connection curves are also the curves connecting two image blocks and are located in seams among the image blocks.

In one embodiment, the aforementioned connection curve acquisition unit 115 may further used for finding out the correspondence relationship between the starting points of the salient curves by a robust algorithm, where the starting points between which there is a correspondence relationship are located on different salient curves which in turn are located in different image block.

In this embodiment, the aforementioned salient curves on which the starting points between which there is a correspondence relationship are located may be the interrelated salient curves, and the curves between the interrelated salient curves may be connection curves.

In preferred embodiments, the aforementioned connection curve may be Hermite curve.

The connection curve acquisition unit 115 may pair several salient curves of the image to be restored to acquire the starting points between which there is a correspondence relationship, while the salient curves on which the starting points between which there is a correspondence relationship are located are the interrelated salient curves, and then connect two interrelated salient curves by a smooth Hermite curve. The Hermite curve is the connection curve which may pass through the seam between the image blocks to connect two image blocks.

Figure 15:
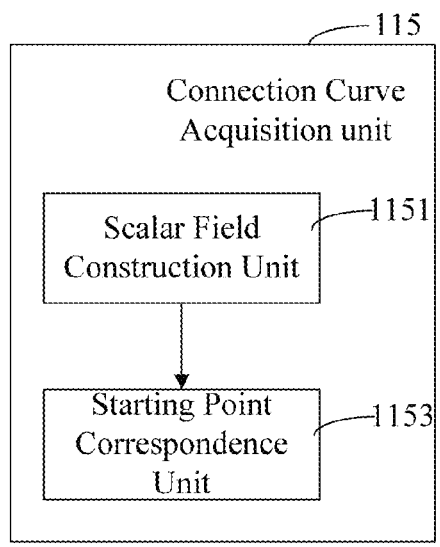
FIG. 15 is a schematic diagram of the structure of the connection curve acquisition unit in FIG. 13.

As shown in FIG. 15, in one embodiment, the aforementioned connection curve acquisition unit 115 may include a scalar field construction unit 1151 and a starting point correspondence unit 1153.

The scalar field construction unit 1151 may be used for constructing the scalar field of the image to be restored according to the salient curves.

In this embodiment, the scalar field construction unit 1151 may construct the scalar field of the image to be restored by following formula:

$$l(r) = \frac{1}{n}\sum_{j=1}^{n} \exp\left(-\frac{|r-a_j|^2}{\varpi_1^2}\right)\exp\left(-\frac{|r-e_j|^2}{\sigma_1^2}\right).$$

Where n is the number of the salient curves, r is any point in the space, $e_j$ is the starting point of the curve j, $a_j$ is a projection of r on the outward closely tangent arc of the curve j at the starting point, and $\sigma_1$ is a control parameter which is 0.05 by default.

The starting point correspondence unit 1153 may be used for, for arbitrary starting point of the salient curve, connecting the arbitrary starting point with other starting point by the connection curve, calculating the integration of the scalar field on the connection curves as distances, forming a relevance set which takes the starting points corresponding to the minimum distances as elements, and acquiring the correspondence relationship of arbitrary starting point of the salient curves according to the difference between the surrounding pixels of the element and the surrounding pixels of the arbitrary starting point.

In this embodiment, the salient curve may include the starting points located at two end of the line segment, respectively. For any one of the starting points, the starting point correspondence unit 1153 may connect it with other starting point around and the line segment connecting two starting points is the connection curve. In this case, the two starting points between which the distance is minimum may be the starting points between which there is a correspondence relationship.

Further, in order to ensure an accurate acquirement of the correspondence relationship, for any one of the starting points, the starting point correspondence unit 1153 may firstly connect the starting point with other starting point by a smooth Hermite curve, where such other starting point is located on a different salient curve which in turn is located in a different image block from the starting point. And then, the integration of the scalar field on this Hermite curve may be calculated and taken as the distance between these two starting points, rather than simply applying the distance between two points.

In this case, the starting point correspondence unit 1153 may extract the starting points corresponding to the minimum distances to form a relevance set which takes the extracted starting points as elements. The formed relevance set may include several elements. Thus, the elements need to be further extracted.

Figure 16:
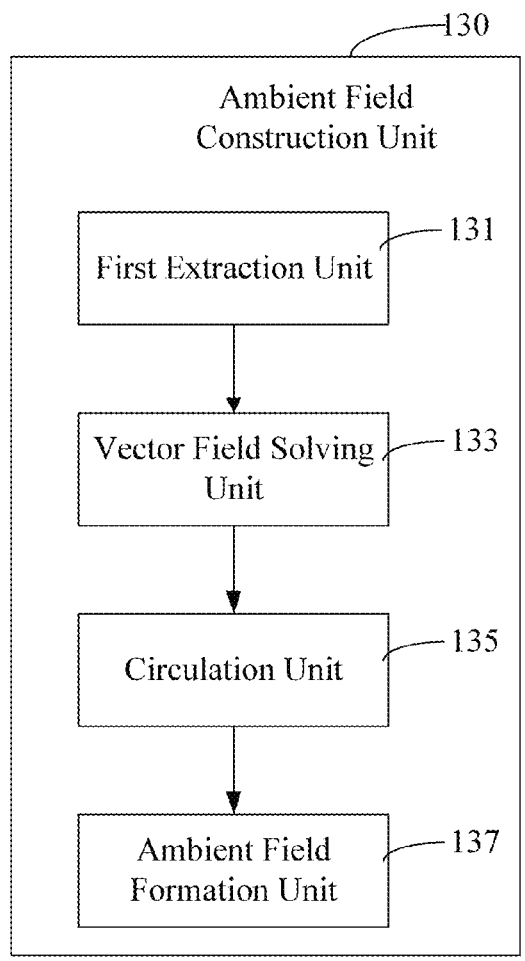
FIG. 16 is a schematic diagram of the structure of the ambient field construction unit in FIG. 12.

Specifically, the starting point correspondence unit 1153 may compare the surrounding pixels of each element of the relevance set with the surrounding pixels of the starting point to acquire the differences, and retain the element corresponding to the minimum difference while remove other elements from the relevance set. In this case, there is a correspondence relationship between the retained element, i.e., the starting point, and present starting point. The two salient curves within two boxes connected by the connection curve are the related salient curves. As shown in FIG. 16, in one embodiment, the aforementioned ambient field construction unit 130 may include a first extraction unit 131, a vector field solving unit 133, a circulation unit 135 and an ambient field formation unit 137.

The first extraction unit 131 may be used for extracting a first longest entire curve from the entire curves of the image to be restored and assigning the first longest entire curve a direction.

In this embodiment, the entire curve of the image to be restored may be formed by the interrelated salient curves and the connection curve connecting the interrelated salient curves. The first extraction unit 131 may extract a longest entire curve from a plurality of entire curves. The extracted longest entire curve may be the first longest entire curve and the first extraction unit 131 may assign the first longest entire curve a random direction.

The vector field solving unit 133 may be used for finding the solution of the harmonic vector field using the entire curve with direction as Dirichlet boundary condition.

In this embodiment, the vector field solving unit 133 may find the solution of the harmonic vector field using the extracted first longest entire curve as the Dirichlet boundary condition.

The circulation unit 135 may be used for extracting the second longest entire curves for the entire curves without directions one by one, and determining the directions of the second longest entire curves according to the harmonic vector field of the entire curve with direction till each of the entire curves without directions is assigned a direction.

In this embodiment, the extracted first longest entire curve is assigned a direction and the magnitude component of the harmonic vector field is correspondingly found. At this time, all of the remaining entire curves are non-directional. Therefore, the circulation unit 135 may assign the remaining entire curves directions one by one.

Specifically, the circulation unit 135 may extract a longest entire curve from the entire curves without directions. The extracted entire curve may be the second longest entire curve. The circulation unit 135 may determine the direction of the second longest entire curve according to the harmonic vector field of the entire curve with direction. Then, the extraction of the entire curve and determination of the direction may be performed repeatedly by the circulation unit 135, until each of the entire curves has been assigned a direction. Each time the extracted longest entire curve is the second longest entire curve.

Further, the circulation unit 135 may test the degree of consistency of the second longest entire curve with the harmonic vector field of the entire curve with direction in the extending direction of the second longest entire curve and in the reverse direction of the extending direction of the second longest entire curve, take the direction with maximum degree of consistency as the direction of the second longest entire curve, and calculate the harmonic vector field of the entire curve with direction, and so on, until each of the entire curves is assigned a direction.

The ambient field formation unit 137 may be used for acquiring direction component of the ambient field by finding the solutions of the harmonic vector field of all entire curves, and calculating the magnitude component of the ambient field according to the number of the interrelated salient curves and the projections of the salient curves.

In this embodiment, the ambient field formation unit 137 may acquire the direction component of the ambient field by finding the solutions of the harmonic vector field of all entire curves using all entire curves as the Dirichlet boundary conditions, and calculate the magnitude component of the ambient field by following formula:

$$d(r) = \frac{1}{k}\sum_{j=1}^{k} \exp\left(-\frac{r-a_j}{\sigma_2^2}\right)\exp\left(-\frac{|r-a_{m(j)}|^2}{\sigma_2^2}\right).$$

Where k is the number of the salient curve pairs which are interrelated, ma) is an curve index associated with the connection curve j, $a_j$ is a projection of r on the outward closely tangent arc of the connection curve j at the starting point, and $\sigma_2$ is a control parameter which is 0.01 by default.

In one embodiment, the aforementioned registering unit 150 may further be used for acquiring a transformation corresponding to the image blocks by minimizing the energy of the connection curve in the ambient field, acquiring the translation and rotation of the connection curve according to the transformation corresponding to the image blocks, and registering the image blocks according to the translation and rotation of the connection curve.

In this embodiment, the registering unit 150 may perform the registering of the image blocks under the guidance of the ambient field. That is, the registering unit 150 may acquire the transformation T to the image blocks, and then cause all of the directions corresponding to the connection curves to be as consistent as possible with the direction of the ambient field. Since the transformation to the image blocks will affect the location and angle of the connection curve and thereby determine the parameters of the connection curve, the connection curves used for connecting the salient curves are essentially functions of the transformation T to the image blocks, i.e. H(T). In this case, related optimization formulas may be acquired:

$$T = \mathrm{argmin}_T E(H(T))$$

$$E(H(T)) = \sum_{i=1}^{k} \int_{h_i(T)} f(r)\,dr$$

$$f(r) = 1 - t(r)^T V(r) + \lambda(1 - d(r)).$$

Where $h_i$ is the ith element of H, t(r) is a tangential direction of $h_i$ at the point r, $\lambda$ is a parameter for adjusting the weights of two terms and is 0.1 by default, and v(r) is the direction of the vector at the point r.

In preferred embodiments, the registering unit 150 may solve the optimization formulas mentioned above using BFGS optimization algorithm to acquire the translation and rotation of the connection curve, and then adjust the locations of the image blocks according to the translation and rotation of the connection curve to acquire the transformation of the image blocks. The transformed image blocks are the registered image blocks.

Figure 17:
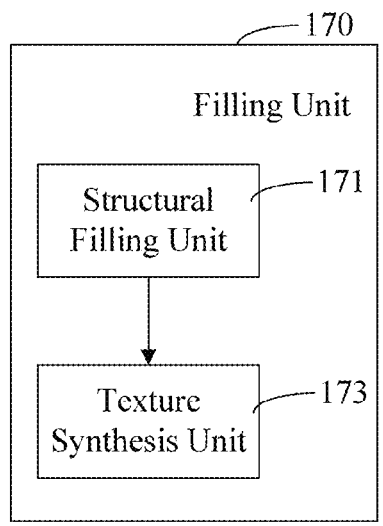
FIG. 17 is a schematic diagram of the structure of the filling unit in FIG. 12.

As shown in FIG. 17, in one embodiment, the aforementioned filling unit 170 may include a structural filling unit 171 and a texture synthesis unit 173.

The structural filling unit 171 may be used for performing structural filling on the registered image blocks by means of the connection curves.

In this embodiment, there are seams among the registered image blocks, therefore the registered image blocks need to be filled by the structural filling unit 171 to acquire a complete image. Specifically, the structural filling unit 171 may perform the structural filling using the connection lines between the image blocks in order to restore the image to be restored in accordance with the structure of the image, thereby the structure of the image may be retained with greatest extent possible and blurring of the structure of the image in the filled area as traditional image filling methods will not occur.

Figure 18:
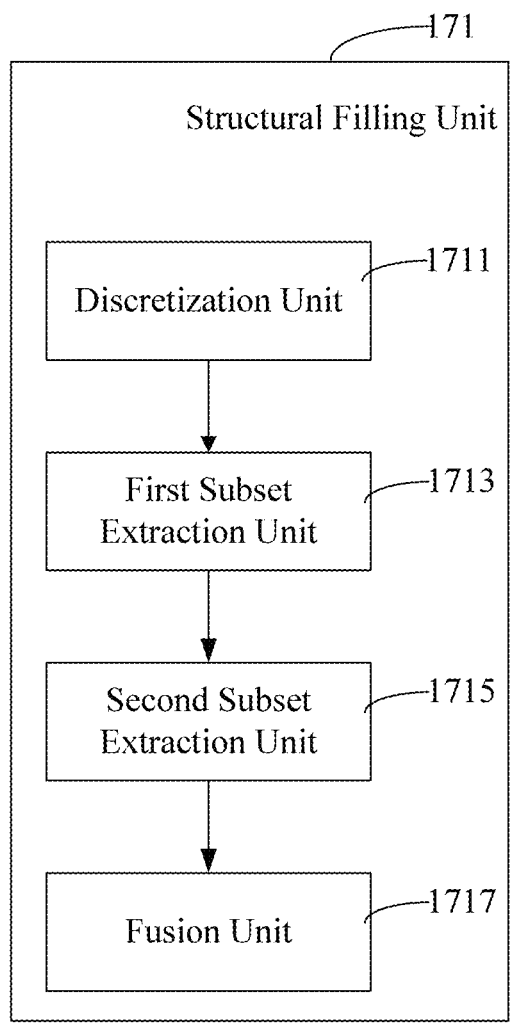
FIG. 18 is a schematic diagram of the structure of the structural filling unit in FIG. 17.

As shown in FIG. 18, in one embodiment, the aforementioned structural filling unit 171 may include a discretization unit 1711, a first subset extraction unit 1713, a second subset extraction unit 1715 and a fusion unit 1717.

The discretization unit 1711 may be used for discretizing the connection curves to acquire ordered point sets.

In this embodiment, the discretization unit 1711 may discretize the connection curve between the image blocks to acquire a ordered point set P={P1, P2, . . . , Pn}.

The first subset extraction unit 1713 may be used for extracting a first subset which includes all of the points which are located in the seams among the image blocks.

In this embodiment, the first subset extraction unit 1713 may select a subset from the ordered point set to acquire the first subset P'={Pi, Pi+1, Pi+2 . . . , Pi+m}. The first subset may includes all of the points located in the seams in the order point set.

The second subset extraction unit 1715 may be used for extracting a second subset which has minimum color difference with the first subset. The length of the second subset may be equal to that of the first subset.

In this embodiment, the second subset extraction unit 1715 may extract a subset from the ordered point set again to acquire the second subset which has minimum color difference with the first subset, i.e., P"={Pk, Pk+1, . . . , Pk+m} as shown in FIG. 10.

The process of extracting the second subset from the ordered point set performed by the second subset extraction unit 1715 is actually a process of searching the pixel block which is similar to the seam in which the first subset is located along the entire curve.

Specifically, the second subset extraction unit 1715 may extract a pixel band from the entire curve containing the connection curve and deform the extracted pixel band taking the first subset as target point set to acquire a deformed pixel band. The deformed pixel band has a minimum color difference with the surrounding pixels of the first subset, i.e. the pixels of the first subset which are located in the image blocks, so as to seamlessly stitch the image blocks.

Where the transformation performed on the extracted pixel band, i.e. the second subset, by the second subset extraction unit 1715 may be moving least squares deformation or other algorithms, for example, thin plate spline function method and radial basis function method, etc.

The thin plate spline function method is an interpolation method for searching a smooth curved surface with minimum bending which passes through all control points as a thin plate. It is achieved by several given "spline" that the surface of the thin plate is smooth, and the extent of the minimum bending is defined by an energy function.

Specifically, the deformation performed on the second subset with the thin plate spline function method by the second subset extraction unit 1715 may be that regarding the whole image to be restored as a xoy plan in a three-dimensional space, the control points may be moved along a z direction and the displacements of other points may be calculated by the interpolation using the thin plate spline function, thereby the displacements of all pixels in all of the second subsets may be calculated to achieve the deformation of the image.

The radial basis function method is mainly used for solving the interpolation problem. Because the radial basis function is only related to a distance to a certain point, it is referred to as radial. Because the radial basis function is the basis for approximating functions in the function space, it is referred to as radial basis.

When deforming the second subset using the radial basis function method, the second subset extraction unit 1715 may regard the image to be restored a xoy plane in a three-dimensional space and the control points are moved along a z direction. In this case, the displacements of other points may be calculated by interpolation using the radial basis function, thereby the displacements of all pixels may be acquired and the deformation of the image may be achieved.

The fusion unit 1717 may be used for deforming the pixel band of the second subset and copying it to the first subset, and fusing the pixels of the first subset with the surrounding pixels.

In this embodiment, the fusion unit 1717 may deform the pixel band corresponding to the second subset and then seamlessly clone it to the seam in which the first subset is located. In preferred embodiments, the fusion unit 1717 may use Poisson fusion method such that the filling will be more realistic and nature.

The texture synthesis unit 173 may be used for performing texture synthesis on the structurally-filled image blocks to acquire a restored image.

In this embodiment, the texture synthesis unit 173 may perform the texture synthesis on the image blocks which are structurally filled to achieve the filling of other portions of the image to be restored.

Specifically, the texture synthesis unit 173 may achieve the texture synthesis of the image to be restored by a content-aware-based filling method to acquire the restored image. Achieving the texture synthesis of the image blocks using the content-aware-based filling method mainly includes that when calculating a restored value for a missing pixel, all of the closest known blocks of the image block containing it are calculated, and an optimization value for this missing pixel may be acquired by summing the color values of these known blocks.

In preferred embodiments, the texture synthesis unit 173 may further introduce an acceleration operation into the content-aware-based filling process to achieve the quick searching of the closest known blocks by a combination of neighbor recommendation and random searching.

The aforementioned image restoration methods and devices may process the image blocks which are initially registered to acquire the connection curves between the image blocks, construct the ambient field of the image to be restored by the connection curves, register the image blocks by minimizing the energy of the connection curves in the ambient field, and perform image filling on the registered image blocks to acquire the restored image. Because the overlapping area between the image blocks may be not necessary for the registering of the image blocks and an accurate registering may be achieved based on the numerical optimization by way of minimizing the energy of the connection curves in the ambient field, the aforementioned image restoration methods and devices may be suitable for the restoration of any damaged image and the accuracy of the restoration may be increased.

The ordinarily skilled person in the art will understand that the all or part of the processes of the methods of the aforementioned embodiments may be implemented by computer programs instructing related hardware. The programs may be stored in a computer-readable storage medium. When being executed, the programs may include the processed of the embodiments of the aforementioned methods. The storage medium may be a disk, an optical disc, a ROM (Read-Only Memory) or a RAM (Random Access Memory), etc.

The embodiments mentioned above only describe several ways for implementing the invention which are described relatively specifically and in detail, however, they are not hereby intended to be understood as limitations to the scope of present disclosure. It should be noted that many variations and improvements may be made by the ordinarily skilled person in the art without departing from the concept of present disclosure, which are all within the protection scope of present disclosure. Therefore, the protection scope of present disclosure should be defined by appended claims.

The invention claimed is:

1. An image repairing method, comprising:
processing image blocks which are initially registered to acquire connection curves between the image blocks;
constructing a circuital field of an image to be repaired by means of the connection curves;
registering the image blocks by minimizing energy of the connection curves in the circuital field; and
performing image filling on the image blocks which are registered to acquire a repaired image,
wherein the processing of image blocks further comprises:
acquiring the image blocks which are initially registered, wherein the image blocks are acquired from the image to be repaired;
acquiring highlight curves in the image blocks inwardly along edges of the image blocks which are initially registered; and
acquiring interrelated highlight curves according to the highlight curves and acquiring the connection curves between the interrelated highlight curves.

2. The method of claim 1, wherein constructing a circuital field of an image to be repaired by means of the connection curves comprises:
extracting a first longest entire curve from entire curves of the image to be repaired and assigning the first longest entire curve a direction;
finding a solution of a harmonic vector field using an entire curve which has already been assigned a direction as Dirichlet boundary condition;
extracting second longest entire curves for entire curves which have not been assigned directions one by one, and determining directions of the second longest entire curves according to harmonic vector fields of entire curves which have already been assigned directions till each of the entire curves which have not been assigned directions is assigned a direction; and
acquiring a direction portion of the circuital field by finding solutions of harmonic vector fields of all entire curves, and calculating a magnitude portion of the circuital field according to number of interrelated highlight curves and projections of highlight curves.

3. The method of claim 1, wherein registering the image blocks by minimizing energy of the connection curves in the circuital field comprises:
acquiring a transformation corresponding to the image blocks by minimizing the energy of the connection curves in the circuital field, acquiring transformation locations and transformation angles of the connection curves according to the transformation corresponding to the image blocks, and registering the image blocks according to the transformation locations and transformation angles of the connection curves.

4. The method of claim 1, wherein performing image filling on the image blocks which are registered to acquire a repaired image comprises:
performing structural filling on the image blocks which are registered by means of the connection curves; and
performing texture synthesis on the image blocks which are structurally filled to acquire the repaired image.

5. The method of claim 4, wherein performing structural filling on the image blocks which are registered by means of the connection curves comprises:
discretizing the connection curves to acquire ordered point sets;
extracting a first subset which includes all of points which are located in gaps between the image blocks;
extracting a second subset which has minimum color difference with the first subset, wherein a length of the second subset is equal to a length of the first subset; and
deforming a pixel band of the second subset and copying it to the first subset, and fusing pixels of the first subset with surrounding pixels.

6. An image repairing device, comprising:
a processing unit which is used for processing image blocks which are initially registered to acquire connection curves between the image blocks;
a circuital field construction unit which is used for constructing a circuital field of an image to be repaired be means of the connection curves;
a registering unit which is used for registering the image blocks by minimizing energy of the connection curves in the circuital field; and
a filling unit which is used for performing an image filling on the image blocks which are registered to acquire a repaired image,
wherein the processing unit comprises:
an image block acquisition unit which is used for acquiring image blocks which are initially registered, wherein the image blocks are acquired from the image to be repaired;
a highlight curve acquisition unit which is used for acquiring highlight curves in the image blocks inwardly along edges of the image blocks which are initially registered; and
a connection curve acquisition unit which is used for acquiring interrelated highlight curves according to the highlight curves and acquiring connection curves between the interrelated highlight curves.

7. The device of claim 6, wherein the circuital field construction unit comprises:
a first extraction unit which is used for extracting a first longest entire curve from entire curves of the image to be repaired and assigning the first longest entire curve a direction;
a vector field solving unit which is used for finding a solution of a harmonic vector field using an entire curve which has already been assigned a direction as Dirichlet boundary condition;
a circulation unit which is used for extracting second longest entire curves for entire curves which have not been assigned directions one by one, and determining directions of the second longest entire curves according to harmonic vector fields of entire curves which have already been assigned directions till each of the entire curves which have not been assigned directions is assigned a direction; and
a circuital field formation unit which is used for acquiring a direction portion of the circuital field by finding solutions of harmonic vector fields of all entire curves, and calculating a magnitude portion of the circuital field according to number of interrelated highlight curves and projections of highlight curves.

8. The device of claim 6, wherein the registering unit is further used for acquiring a transformation corresponding to the image blocks by minimizing the energy of the connection curves in the circuital field, acquiring transformation locations and transformation angles of the connection curves according to the transformation corresponding to the image blocks, and registering the image blocks according to the transformation locations and transformation angles of the connection curves.

9. The device of claim 6, wherein the filling unit comprises:
- a structural filling unit which is used for performing structural filling on the image blocks which are registered by means of the connection curves; and
- a texture synthesis unit which is used for performing texture synthesis on the image blocks which are structurally filled to acquire the repaired image.

10. The device of claim 9, wherein the structural filling unit comprises:
- a discretization unit which is used for discretizing the connection curves to acquire ordered point sets;
- a first subset extraction unit which is used for extracting a first subset which includes all of points which are located in gaps between the image blocks;
- a second subset extraction unit which is used for extracting a second subset which has minimum color difference with the first subset, wherein a length of the second subset is equal to a length of the first subset; and
- a fusion unit which is used for deforming a pixel band of the second subset and copying it to the first subset, and fusing pixels of the first subset with surrounding pixels.

11. An image repairing device, comprising a storage medium that stores machine-readable instructions and a processor configured to read and execute the instructions stored in the storage medium to:
- process image blocks which are initially registered to acquire connection curves between the image blocks;
- construct a circuital field of an image to be repaired be means of the connection curves;
- register the image blocks by minimizing energy of the connection curves in the circuital field; and
- perform an image filling on the image blocks which are registered to acquire a repaired image, wherein, for processing of the image blocks, the processor is further configured to read and execute the instructions stored in the storage medium to:
- acquire image blocks which are initially registered, wherein the image blocks are acquired from the image to be repaired;
- acquire highlight curves in the image blocks inwardly along edges of the image blocks which are initially registered; and
- acquire interrelated highlight curves according to the highlight curves and acquiring connection curves between the interrelated highlight curves.

* * * * *